United States Patent
Ronkainen et al.

(10) Patent No.: US 11,877,284 B2
(45) Date of Patent: Jan. 16, 2024

(54) INTEGRATED ACCESS AND BACKHAUL WITH REVERSED SCHEDULING

(71) Applicant: Telefonaktiebolaget LM Ericsson (publ), Stockholm (SE)

(72) Inventors: Henrik Ronkainen, Södra Sandby (SE); Christer Östberg, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 17/424,626

(22) PCT Filed: Jan. 20, 2020

(86) PCT No.: PCT/SE2020/050048
§ 371 (c)(1),
(2) Date: Jul. 21, 2021

(87) PCT Pub. No.: WO2020/153893
PCT Pub. Date: Jul. 30, 2020

(65) Prior Publication Data
US 2022/0086884 A1    Mar. 17, 2022

Related U.S. Application Data

(60) Provisional application No. 62/794,932, filed on Jan. 21, 2019.

(51) Int. Cl.
*H04W 72/12* (2023.01)
*H04W 72/20* (2023.01)
(Continued)

(52) U.S. Cl.
CPC .......... *H04W 72/20* (2023.01); *H04W 28/16* (2013.01); *H04W 40/22* (2013.01); *H04W 92/12* (2013.01)

(58) Field of Classification Search
CPC ..... H04W 72/12; H04W 72/20; H04W 92/12; H04W 28/16; H04W 40/22; H04W 68/02;
(Continued)

(56) References Cited

U.S. PATENT DOCUMENTS 9,078,270 B2 * 7/2015 Ji ..................... H04B 7/15542
10,383,136 B2 * 8/2019 Wang ................ H04W 72/1263
(Continued)

FOREIGN PATENT DOCUMENTS

WO    2019194661 A1    10/2019

OTHER PUBLICATIONS

Huawei, et al., "R2-1817906: IAB bearer mapping decisions," 3GPP TSG-RAN WG2#104, Jan. 12-16, 2018, Spokane, Washington, 7 pages.
(Continued)

*Primary Examiner* — Man U Phan
(74) *Attorney, Agent, or Firm* — Withrow & Terranova, PLLC

(57) ABSTRACT

There is provided mechanisms for performing IAB in a cellular telecommunications network that comprises a first IAB node and a second IAB node. A method is performed by the first IAB node. The method comprises scheduling, in a first phase, downstream backhaul data from the first IAB node to the second IAB node. The method comprises receiving, in a third phase, from the second IAB node, upstream backhaul data as scheduled by the second IAB node.

18 Claims, 23 Drawing Sheets

(51) Int. Cl.
*H04W 28/16* (2009.01)
*H04W 40/22* (2009.01)
*H04W 92/12* (2009.01)

(58) Field of Classification Search
CPC ....... H04W 92/14; H04W 8/20; H04W 48/12;
H04W 48/16; H04W 24/02; H04W 24/08;
H04W 56/00; H04W 72/1289; H04W
72/1226; H04W 72/1263
USPC .......................................................... 370/329
See application file for complete search history.

(56) References Cited

U.S. PATENT DOCUMENTS

| | | | | |
|---|---|---|---|---|
| 11,076,415 | B2 * | 7/2021 | Wang | H04W 72/54 |
| 11,140,695 | B1 * | 10/2021 | Eyuboglu | H04W 72/535 |
| 11,172,407 | B2 * | 11/2021 | Abedini | H04W 24/10 |
| 11,206,549 | B1 * | 12/2021 | Eyuboglu | H04J 11/0079 |
| 11,350,410 | B2 * | 5/2022 | You | H04W 28/16 |
| 11,395,320 | B2 * | 7/2022 | Keskitalo | H04W 72/23 |
| 11,564,152 | B2 * | 1/2023 | Bao | H04W 48/16 |
| 2014/0269455 | A1 | 9/2014 | Kim, II | H04W 48/12 370/280 |
| 2017/0064731 | A1 | 3/2017 | Wang et al. | |
| 2019/0230606 | A1 | 7/2019 | Ryu et al. | |
| 2021/0337530 | A1 * | 10/2021 | Raghavan | H04B 7/0628 |
| 2021/0337566 | A1 * | 10/2021 | Wang | H04W 72/1263 |

OTHER PUBLICATIONS

Intel Corporation, "R1-1806551: PHY layer enhancement for NR IAB," 3GPP TSG RAN WG1 #93, May 21-25, 2018, Busan, South Korea, 17 pages.
Sony, "R2-1817072: Resource allocation in IAB," 3GPP TSG RAN WG2 Meeting #104, Jan. 12-16, 2018, Spokane, Washington, 3 pages.
Extended European Search Report for European Patent Application No. 20746023.9, dated Sep. 16, 2022, 12 pages.
Author Unknown, "3rd Generation Partnership Project; Technical Specification Group Radio Access Network; Study on Integrated Access and Backhaul; (Release 15)," 3GPP TR 38.874 1.0.0, Dec. 2018, 3GPP Organizational Partners, 111 pages.
Author Unknown, "3rd Generation Partnership Project; Technical Specification Group Radio Access Network; NG-RAN; Architecture description (Release 15)," 3GPP TS 38.401 V15.3.0, Sep. 2018, 3GPP Organizational Partners, 39 pages.
Ericsson, "R2-1814365: Uplink Scheduling in IAB Networks," 3GPP TSG-RAN WG2 Meeting #103b, Oct. 8-12, 2018, Chengdu, P.R. China, 6 pages.
LG Electronics Inc., "R2-1812638: Scheduling enhancement in IAB," 3GPP TSG-RAN WG2 Meeting #103, Aug. 20-24, 2018, Gothenburg, Sweden, 2 pages.
International Search Report and Written Opinion for International Patent Application No. PCT/SE2020/050048, dated May 12, 2020, 11 pages.

* cited by examiner

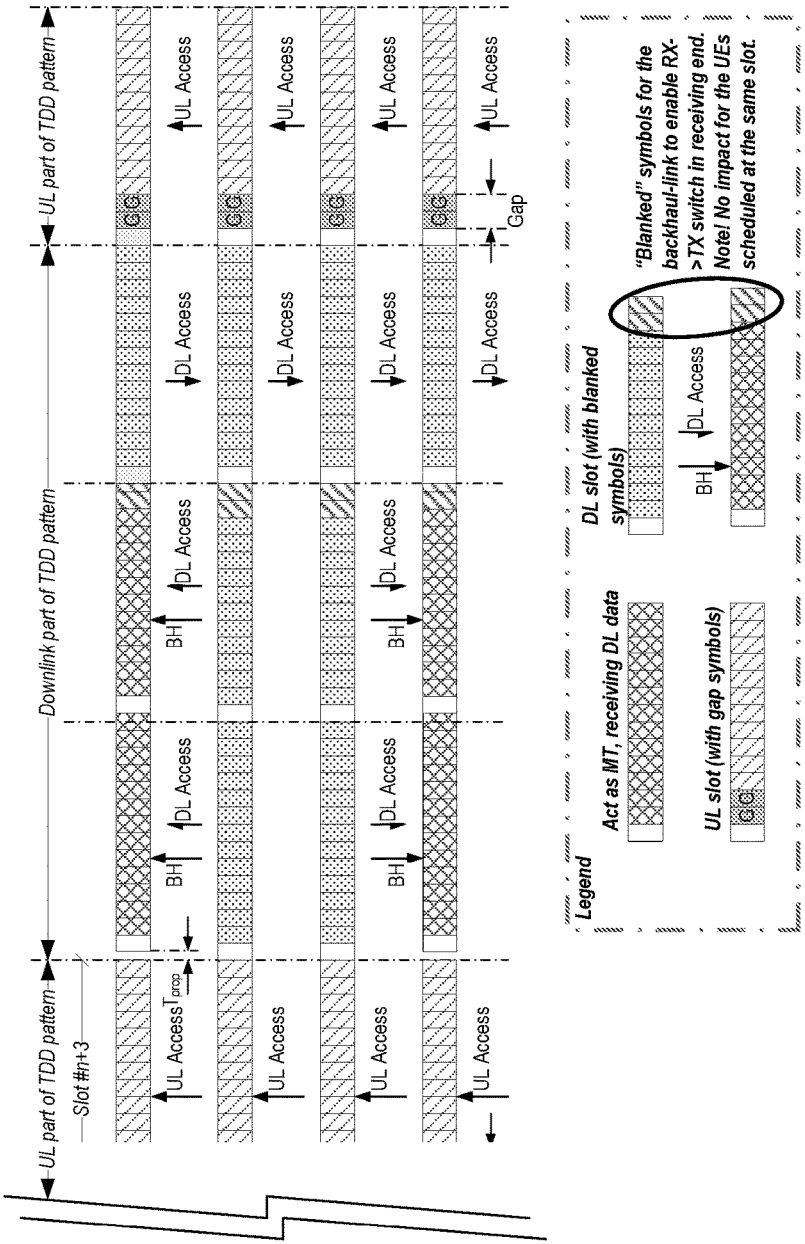
Continued From FIG. 18A
FIG. 18B

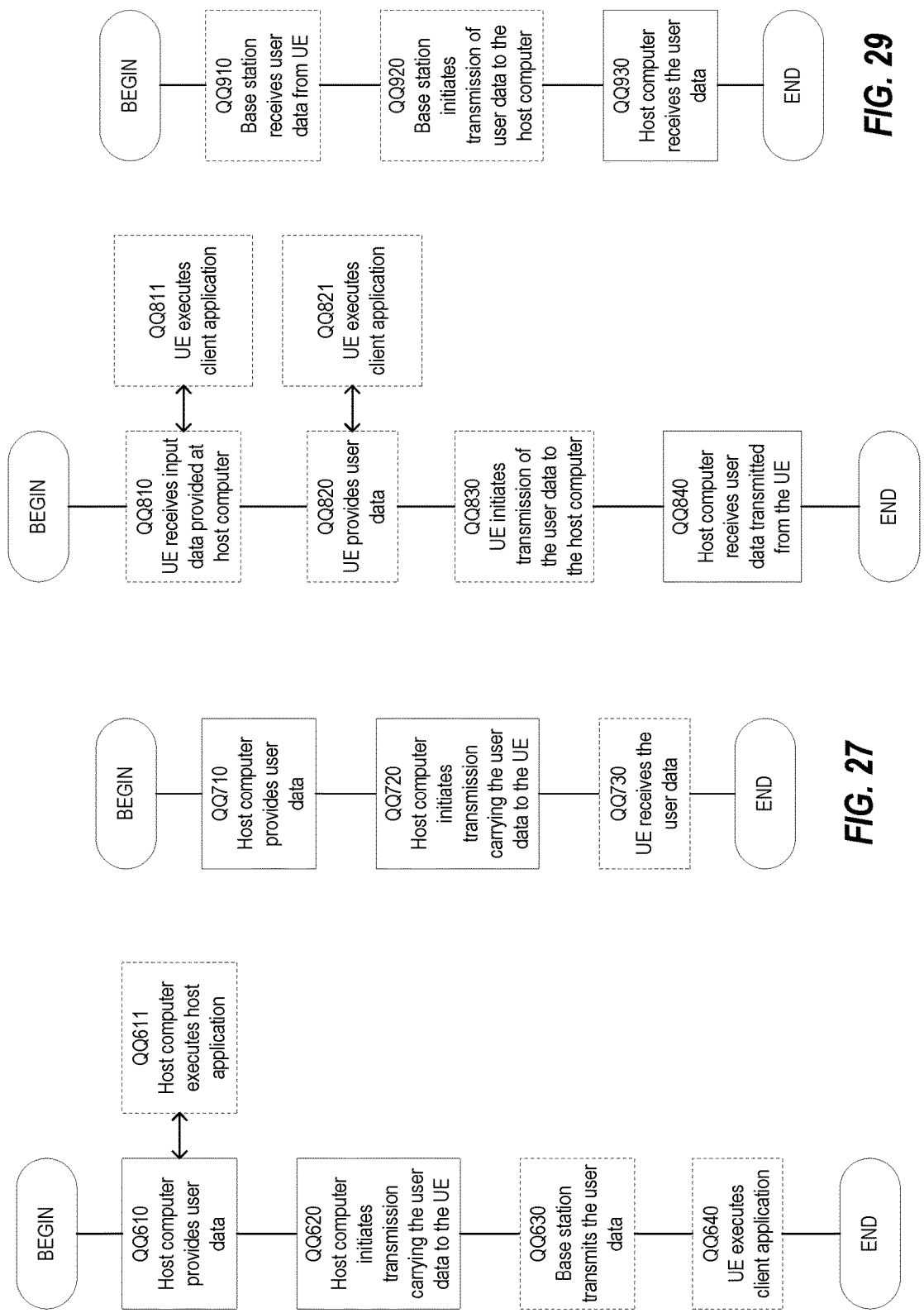

INTEGRATED ACCESS AND BACKHAUL WITH REVERSED SCHEDULING

This application is a 35 U.S.C. § 371 national phase filing of International Application No. PCT/SE2020/050048, filed Jan. 20, 2020, which claims the benefit of U.S. Provisional Application No. 62/794,932, filed Jan. 21, 2019, the disclosures of which are incorporated herein by reference in their entireties.

TECHNICAL FIELD

Embodiments presented herein relate to Integrated Access and Backhaul (IAB) in a cellular telecommunications network that comprises at least two IAB nodes.

BACKGROUND

As described in Study on Integrated Access and Backhaul, 3GPP TR 38.874 ver 1.0.0 (incorporated herein by reference), one of the potential technologies targeted to enable future cellular network deployment scenarios and applications is the support for wireless backhaul and relay links enabling flexible and very dense deployment of NR cells without the need for densifying the wired transport network proportionately. The expected larger bandwidth available for NR compared to LTE (e.g. mmWave spectrum) along with the native deployment of massive MIMO or multi-beam systems in NR creates an opportunity to develop and deploy integrated access and backhaul (IAB) links. I.e. the same spectrum and radio access technology (i.e. the NR Uu interface) is used both in the wireless backhaul link between access nodes and in the access link between access nodes and User Equipment (UE).

FIG. 1 illustrates the IAB high-level architecture in terms of a cellular telecommunications network 100. The cellular telecommunications network 100 comprises a Core Network and IAB nodes 200a, 200b that serve User Equipment (UE) 300a, 300b, 300c. The access node with a wired connection to the Core Network (CN) is called Donor node and the access node using a wireless backhaul is called IAB node. In some aspects also the Donor node will hereinafter be regarded as an IAB node, where this IAB node only has a downstream connection to other IAB nodes whereas the remaining IAB nodes at least have an upstream connection to another IAB node (or Donor node). The Donor node may be a fully integrated gNB or it may use a split architecture with discrete Central Units (CUs) for control plane (CP) and user plane (UP) together with one or more Distributed Units (DUs) as depicted in FIG. 2, where E1, F1-C, F1-U are communication interfaces. The latter case is depicted in FIG. 1 below.

Even though not shown in FIG. 1, it shall be noted that also the donor node and all IAB nodes may support access links to UEs. Furthermore, the wireless backhaul link is not limited to carry NR UE traffic and other data may be transferred as well such as LTE data from IAB-N collocated eNBs or data from other equipment connected to the IAB nodes.

As IAB nodes can be cascaded into multiple hops (in different topologies), there is a need to understand some more terms, all illustrated in FIG. 3. Traffic going in the direction from the donor node (from the north end) is denominated as downstream, while traffic flowing in the direction towards the donor node is defined as upstream. The architecture is very hierarchical and the node closer to the donor (or the donor itself) schedules all traffic (up/downstream) for the backhaul link south of the node. Thus, there is a need to identify the two different roles for the nodes transmitting on a backhaul link, where the controlling/scheduling node is called parent IAB node (or just parent node for short) and the scheduled IAB node takes the role called child IAB node (or just child node for short). As multiple hops can be supported, it is understood that an IAB node can act as both parent node and child node and these IAB nodes are in this document denominated transit IAB nodes (of just transit node for short).

There are different architecture alternatives for the IAB node. Either it may work, and thus be configured as, as a complete gNB or it may be a Distributed Unit (DU) part of a gNB including a CU with wired connectivity to the core network. Nevertheless, for all alternatives the IAB node is equipped with a Mobile Termination (MT) functionality that terminates the radio interface layers of the backhaul Uu interface toward its parent node.

FIG. 4 shows the internal functionality of the IAB node based on the gNB split architecture where the MT function is included together with the DU functionality.

The typical scenario for an IAB deployment would be an IAB node where the MT operates in a sector with its antenna directed towards the parent node. To achieve extended coverage with support of the IAB node, it would be equipped with additional sectors in other directions as illustrated in FIG. 5. The simple IAB node structure in FIG. 4 is a possible solution for many deployments. In case (B) of FIG. 6, one common DU is used for several sectors. However, other implementations are possible, e.g. case (A) in FIG. 6 where 3 DUs are inter-connected with wired transport to forward traffic between the different sectors.

Regardless of the implementation options depicted in FIG. 6, several MTs in one and the same IAB node are possible, typically from different sectors to enable multiple parents (IAB links).

Downlink IAB node transmissions (i.e. transmissions on backhaul links from an IAB node to child IAB nodes served by the IAB node and transmissions on access links from an IAB node to UEs served by the IAB node) should be scheduled by the IAB node itself. Uplink IAB transmission (i.e., transmissions on a backhaul link from an IAB node to its parent IAB node or IAB-donor) should be scheduled by the parent IAB node or IAB-donor.

The scheduling principle is illustrated in FIG. 7. As indicated, the scheduler in the parent node (DU) is responsible to schedule DL and UL traffic for both its own access link UEs as well as MTs part of a child IAB node. In the figure, it is indicated that there is neither co-scheduling of downlink access together with uplink backhaul in upstream nor co-scheduling of uplink access together with downlink backhaul in downstream in the IAB node due to potential timing and resource conflicts which will be described later.

As mentioned in above, IAB is mainly expected to be used on higher frequencies where there is wide spectrum available. These high bands are unpaired and thus, TDD (Time Division Duplex) will be applied. In FIG. 8 a typical TDD pattern 800 is shown, where some time slots are reserved for downlink (D) and others for uplink (U), and then there is a gap (or guard period) with no transmission to enable switching between transmission/reception in UEs and access nodes.

In an IAB system, this timing will to some extent be violated as either end of a backhaul link must operate with an inverted TDD configuration. E.g. a child node cannot transmit downlink data while receiving downstream data from its parent node. In time, downlink is (typically) dominating and parts of the downlink time can be used for IAB data transfer ("slot stealing"). See the example in FIG. 9 where the child node operates in receive (RX) mode even though the TDD pattern 900 indicates Downlink (D). Similar, but opposite is valid for the parent node for parts of the next downlink period. It can be noted that the MT in a child node does not adhere to the used TDD pattern during the upstream phase and hence, does not behave like a normal UE.

There currently exist certain challenge(s) as there are several different problems with the existing solution as defined by 3GPP so far:

First, transmit/receive (TX/RX) timing is aligned for a normal gNB. Downlink data for the MT in an IAB node will be scheduled by its parent and the data arrives "late" due to the propagation delay. In this state, the child node is in receive (RX) mode and could schedule UL data from UEs on its access link and if a transit node, upstream data from backhaul child nodes. To reach an aligned timing at the receiving node, the scheduled users advance their transmit (TX) timing. However, in this scenario the RX timing for the different incoming data streams (DL backhaul, UE access and UL backhaul) will be misaligned. Similar issue is applicable for transmission. Uplink data from an MT will advance its TX timing and thus not aligned with the TX timing for downlink traffic from the same node. The problem can "inefficiently" be solved by time separation of the different phases.

Second, the first IAB hop must be dimensioned to carry all traffic for all nodes in a multi-hop chain/tree. Thus, the IAB node located immediately southern of the first IAB hop will be locked into RX mode and its own downlink/TX time may be limited if it cannot co-schedule DL data to access users and upstream backhaul.

Third, scheduling of upstream backhaul link is triggered by the child IAB node (MT) transmitting buffer status reports (BSR) and/or scheduling request (SR). Thus, there is an extra roundtrip to empty the upstream data buffer from an IAB node compared to downlink. The upstream backhaul data from an IAB node may be triggered either from a UE, internally in the DU or from other equipment connected to the node, using the IAB for transport.

Fourth, using a strict hierarchical scheduling approach require that the IAB node implements transmission support for all the UE UL channels in the MT. This must be in operation not only during the pre-IAB-mode phase (sometimes referred to as called "stage 1") but also during IAB-mode phase (sometimes referred to as "stage 2")

Fifth, a strict hierarchical scheduling strategy rely on physical uplink control channel (PUCCH) signalling (used for transmission of uplink control) which link budget-wise may be limiting for high frequencies.

Sixth, a strict hierarchical scheduling strategy may allow simultaneous uplink from IAB nodes as well UEs. However, here there may be huge power imbalance which may be a problem at the receiving end. Also, this case is typically not the limiting factor and instead it would be preferred to enable co-scheduling of downlink access together with upstream data.

SUMMARY

Certain aspects of the present disclosure and their embodiments may provide solutions to these or other challenges. Instead of using a strict hierarchical scheduling structure in an IAB network where the parent node schedules both UL and DL data over the IAB link, use a symmetric approach for each IAB link where the parent node can delegate the IAB link upstream scheduling responsibility to the child node, i.e. reversed scheduling. In practice this implies that only downlink scheduling will take place over each IAB link. See the principle difference between the two cases in FIGS. 10A and 10B.

Compared to prior art, the invention introduces a reverted scheduling strategy for IAB links. This implies that the participating nodes will adhere to the physical channels and their timing normally used during downlink slots in a TDD system (instead of using "uplink" transmission in these slots).

There are, proposed herein, various embodiments which address one or more of the issues disclosed herein.

According to a first aspect there is presented a method for performing IAB in a cellular telecommunications network that comprises a first IAB node and a second IAB node. The method is performed by the first IAB node. The method comprises scheduling, in a first phase, downstream backhaul data from the first IAB node to the second IAB node. The method comprises receiving, in a third phase, from the second IAB node, upstream backhaul data as scheduled by the second IAB node.

According to a second aspect there is presented a first IAB node for performing IAB in a cellular telecommunications network that comprises the first IAB node and a second IAB node. The first IAB node comprises processing circuitry. The processing circuitry is configured to cause the first IAB node to schedule, in a first phase, downstream backhaul data from the first IAB node to the second IAB node. The processing circuitry is configured to cause the first IAB node to receive, in a third phase, from the second IAB node, upstream backhaul data as scheduled by the second IAB node.

According to a third aspect there is presented a computer program for insert purpose. The computer program comprises computer program code which, when run on processing circuitry of a first IAB node, causes the first IAB node to perform a method according to the first aspect.

According to a fourth aspect there is presented a method for performing IAB in a cellular telecommunications network that comprises a first IAB node and a second IAB node. The method is performed by the second IAB node. The method comprises receiving, in a first phase, from the first IAB node, downstream backhaul data as scheduled by the first IAB node. The method comprises scheduling, in a third phase, upstream backhaul data from the second IAB node to the first IAB node.

According to a fifth aspect there is presented a second IAB node for performing IAB in a cellular telecommunications network that comprises a first IAB node and the second IAB node. The second IAB node comprises processing circuitry. The processing circuitry is configured to cause the second IAB node to receive, in a first phase, from the first IAB node, downstream backhaul data as scheduled by the first IAB node. The processing circuitry is configured to cause the second IAB node to schedule, in a third phase, upstream backhaul data from the second IAB node to the first IAB node.

According to a sixth aspect there is presented a computer program for insert 2 purpose, the computer program comprising computer program code which, when run on processing circuitry of a second IAB node, causes the second IAB node to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Certain embodiments may provide one or more of the following technical advantage(s). The possibility to co-schedule upstream data over IAB link together with DL data over access link is enabled. This is especially important over the first hop in an IAB scenario as the node will be locked into RX mode for substantial amount of time. The upstream data transmission delay is reduced as the child node may schedule upstream transmission without a preceding SR/BSR. The IAB node does not have to implement support for all uplink channels and can rely on the downlink part of MT. (exception for the initial access, stage 1) The timing (alignment) problems are implicitly solved. Potential PUCCH limitations are avoided.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

BRIEF DESCRIPTION OF DRAWINGS

The inventive concept is now described, by way of example, with reference to the accompanying drawings, in which:

FIGS. 18A and 18B together present a detailed timing diagram for a two-hop scenario with reversed scheduling, according to some aspects of the present disclosure.

FIG. 26 depicts a flowchart of a method implemented in a communication system including a host computer, a base station and a user equipment in accordance with some aspects of the present disclosure.

FIG. 27 depicts a flowchart of a method implemented in a communication system including a host computer, a base station and a user equipment in accordance with some aspects of the present disclosure.

FIG. 28 depicts a flowchart of a method implemented in a communication system including a host computer, a base station and a user equipment in accordance with some aspects of the present disclosure.

FIG. 29 depicts a flowchart of a method implemented in a communication system including a host computer, a base station and a user equipment in accordance with some aspects of the present disclosure.

These figures will be better understood by reference to the following detailed description.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 8:
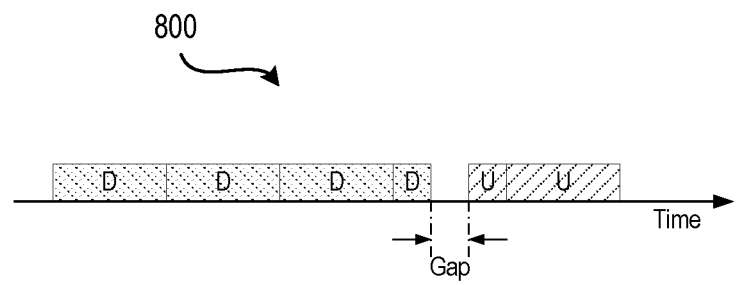
FIG. 8 depicts a typical TDD pattern.
Figure 9:
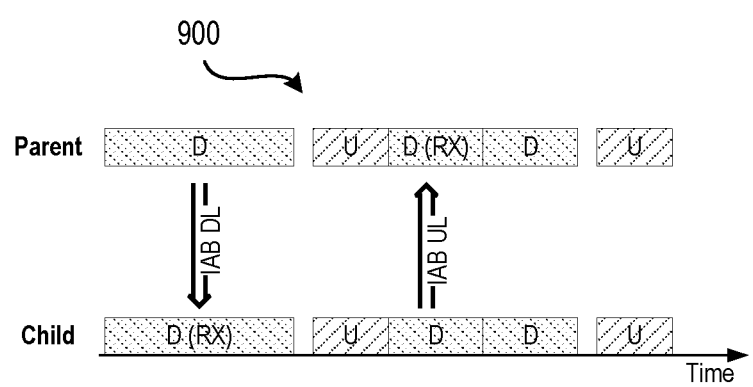
FIG. 9 is a diagram illustrating the principle for IAB downlink "slot stealing"
Figure 10A:
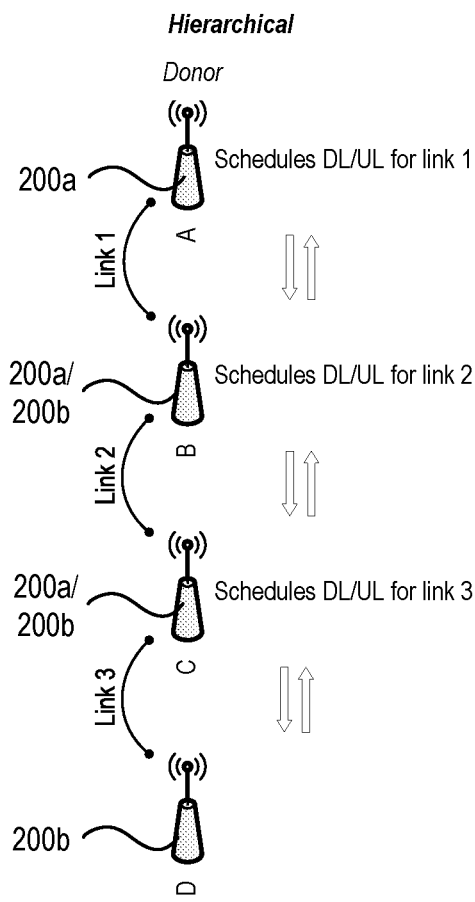
FIGS. 10A and 10B are diagrams that illustrate hierarchical scheduling (FIG. 10A) and reversed scheduling (FIG. 10B), according to some aspects of the present disclosure.
Figure 10B:
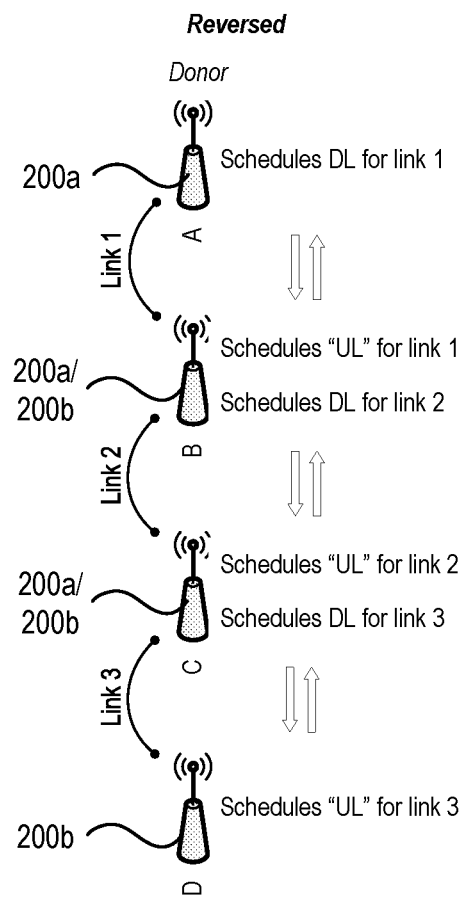
Figure 11:
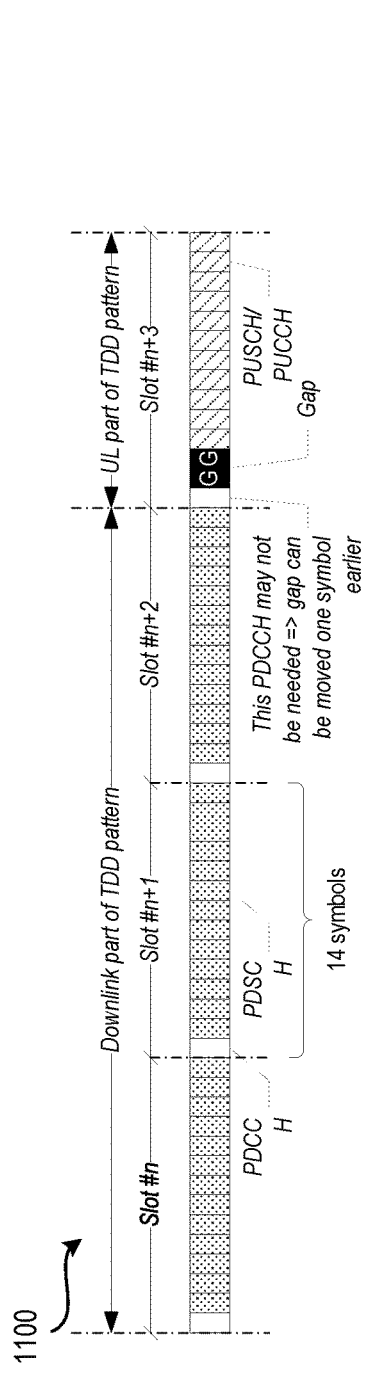
FIG. 11 is a diagram illustrating a TDD reference picture.

FIG. 11 shows in more detail a TDD pattern 1100 compared to what was depicted in earlier FIG. 8. As can be seen, each slot is divided into 14 symbols and where PDCCH symbols carry control/scheduling information for DL data transmitted in physical downlink shared channel (PDSCH) symbols and UL data transmitted in physical uplink shared channel (PUSCH) symbols. PUCCH symbols are used for transmission of UL control information such as HARQ feedback (ack/nack), channel state information (CSI) as well as SR and BSR. The exact allocation in time for the PUCCH/PUSCH is not indicated as it is not important for the herein disclosed embodiments. It shall be noted that the exact symbol/TDD layout may differ and FIG. 11 shows one example. E.g., as noted in the FIG. 11, the initial PDCCH symbol in the UL part may not be required.

Figure 12:
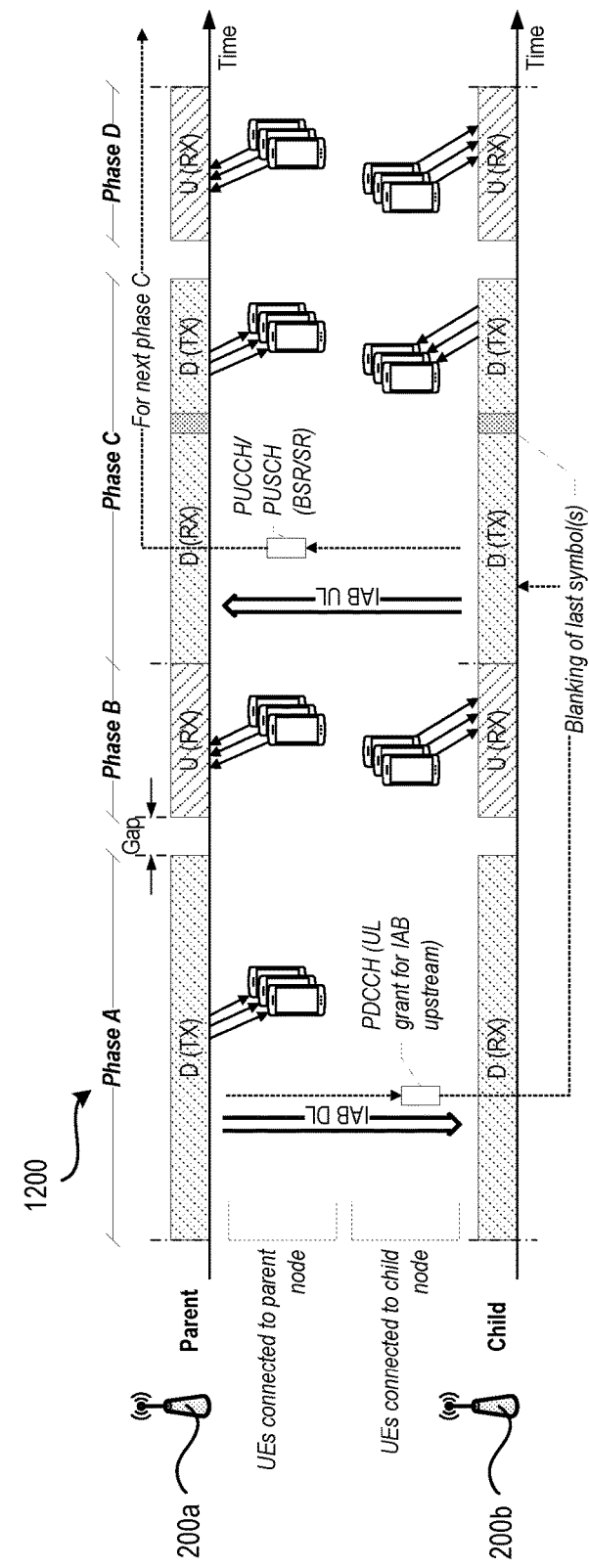
FIG. 12 shows IAB scheduling.

FIG. 12 illustrates IAB data scheduling 1200 according to the previous IAB implementations. The parent and child node each has a different set of UEs connected and from time perspective the behavior/scenario can be divided into 4 phases, a-d (which are repeated in a recurrent pattern, a-d, a-d . . . a-d (these phases may also be referred to as a first phase, a second phase, a third phase, and a fourth phase, respectively)):

a. This is the downlink period according to the overall TDD pattern. Downstream backhaul data is transmitted on PDSCH from parent to child node and the MT receives the DL resource information from the DCI (DL Control Information) part of the PDCCH. The parent node may also schedule its connected UEs during this period, either in frequency, time or spatial separation. The child node is in RX mode and can thus not schedule its own connected UEs during this period even though these slots are downlink according to used TDD pattern. The parent node also includes UL grant to the child node MT, indicating resource information for the upstream backhaul data to be transmitted during phase C.
  b. During this phase, both parent and child node receives UL data (according to earlier scheduling) from their connected UEs. The phase is preceded by a transmission gap to enable switching between TX and RX.
  c. This is a TDD DL period. However, the parent node operates in RX mode to receive upstream backhaul data on PUSCH from the child node, previously scheduled during phase A. If more data needs to be transmitted, the child node indicates SR/BSR on PUCCH or PUSCH (MAC CE) to get grant/scheduling information during next phase A. The timing of this transmission from the child node is aligned with the normal DL timing (i.e. no timing advance as used for normal UE UL transmission) to allow reception of all symbols during phase B. It shall be noted that there is no issue/problem by skipping timing advance here since co-scheduling of UE UL is not applicable as TDD DL. As the child node is blocked in RX mode during phase A, the backhaul transmission does not occupy the complete time in phase C to enable DL transmission on the access link of the child node (during the last part of phase C). Due to propagation delay, the last symbol(s) in the backhaul transmission must be blanked/punctured to allow DL access link transmission also in the parent node. Typically, the amount of UL data is less than DL and the length of the first/second part of phase C may be adopted to the suitable length/size.
  d. The same as for phase b.

The embodiments disclosed herein relate to mechanisms for performing IAB in a cellular telecommunications network 100 that comprises a first IAB node 200a and a second IAB node 200b. In order to obtain such mechanisms, there is provided a first IAB node 200a, methods performed by the first IAB node 200a, a computer program product comprising code, for example in the form of a computer program, that when run on the first IAB node 200a, causes the first IAB node 200a to perform the method. In order to obtain such mechanisms, there is further provided a second IAB node 200b, methods performed by the a first IAB node 200a, a computer program product comprising code, for example in the form of a computer program, that when run on the second IAB node 200b, causes the second IAB node 200b to perform the method.

Figure 13:
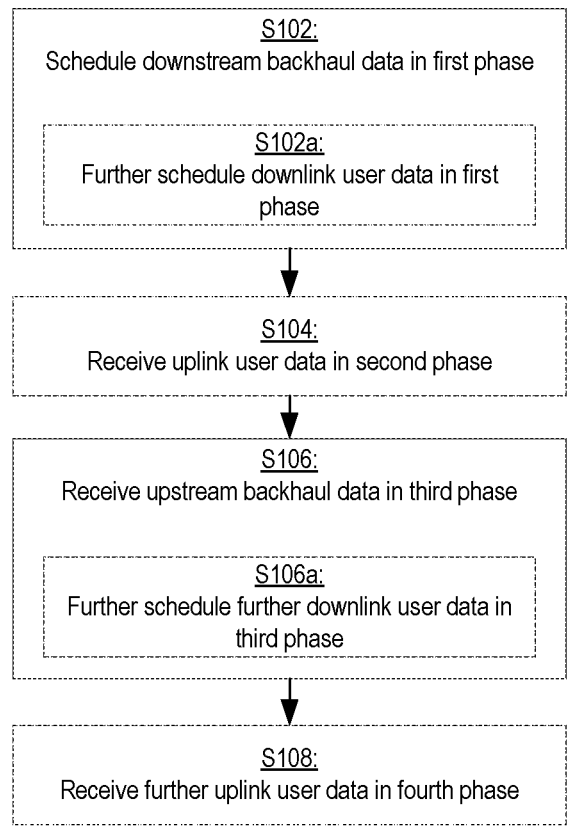
FIG. 13 is a flowchart illustrating embodiments of methods for performing IAB in a cellular telecommunications network.

FIG. 13 is a flowchart illustrating embodiments of methods for performing IAB in a cellular telecommunications network 100. The methods are performed by the first IAB node 200a. The methods are advantageously provided as computer programs.

Each IAB node in downstream communication with another IAB node schedules its own transmitted data. Hence, the first IAB node 200a is configured to perform actions S102 and S106:

S102: The first IAB node 200a schedules, in a first phase (also denoted phase A), downstream backhaul data from the first IAB node 200a to the second IAB node 200b.

S106: The first IAB node 200a receives, in a third phase (also denoted phase C), from the second IAB node 200b, upstream backhaul data as scheduled by the second IAB node 200b.

Embodiments relating to further details of performing IAB in a cellular telecommunications network 100 as performed by the first IAB node 200a will now be disclosed.

In some embodiments, also downlink user data is scheduled in the first phase. Hence, according to an embodiment, the first IAB node 200a is configured to perform (optional) action S102a as part of action S102:

S102a: The first IAB node 200a further schedules, in the first phase, downlink user data from the first IAB node 200a to a first user equipment 300a in communication with the first IAB node 200a.

In some embodiments, uplink user data is received in a second phase (also denoted phase B). Hence, according to an embodiment, the first IAB node 200a is configured to perform (optional) action S104:

S104: The first IAB node 200a receives, in a second phase placed between the first phase and the third phase, uplink user data from the first user equipment 300a, as scheduled by the first IAB node 200a.

In some embodiments, further downlink user data is scheduled in the third phase. Hence, according to an embodiment, the first IAB node 200a is configured to perform (optional) action S106a as part of action S106:

S106a: The first IAB node 200a further schedules, in the third phase, further downlink user data from the first IAB node 200a to the first user equipment 300a.

In some embodiments, further uplink user data is received in a fourth phase (also denoted phase D). Hence, according to an embodiment, the first IAB node 200a is configured to perform (optional) action S108:

S108: The first IAB node 200a receives, in a fourth phase placed after the third phase and before a subsequent first phase, further uplink user data from the first user equipment 300a, as scheduled by the first IAB node 200a.

In some embodiments, the first IAB node 200a does not transmit uplink scheduling information to the second IAB node 200b in the first phase.

In some embodiments, the downstream backhaul data is composed of symbols, and wherein the last one or more symbols of the downstream backhaul data of the first phase are blanked.

In some embodiments, the upstream backhaul data is composed of symbols, and wherein the last one or more symbols of the upstream backhaul data of the third phase are blanked.

In some embodiments, downstream backhaul data of the first phase is acknowledged or negatively acknowledged by the second IAB node 200b in the third phase, and/or upstream backhaul data of the third phase is acknowledged or negatively acknowledged by the first IAB node 200a in a subsequent first phase.

In some embodiments, the upstream backhaul data includes variable number of slots from one third phase to a subsequent third phase.

In some embodiments, the variable number of slots is indicated by either a last backhaul slot indicator included in a last slot of the variable number of slots or a number of the variable number of slots included in a first slot of the variable number of slots.

In some embodiments, the downstream backhaul data is transmitted by a distributed unit (DU) at the first IAB node 200a.

In some embodiments, the upstream backhaul data is received by a second mobile termination, MT, interface at the first IAB node 200a.

In some embodiments, the first IAB node 200a is a parent IAB node and the second IAB node 200b is a child IAB node.

Figure 14:
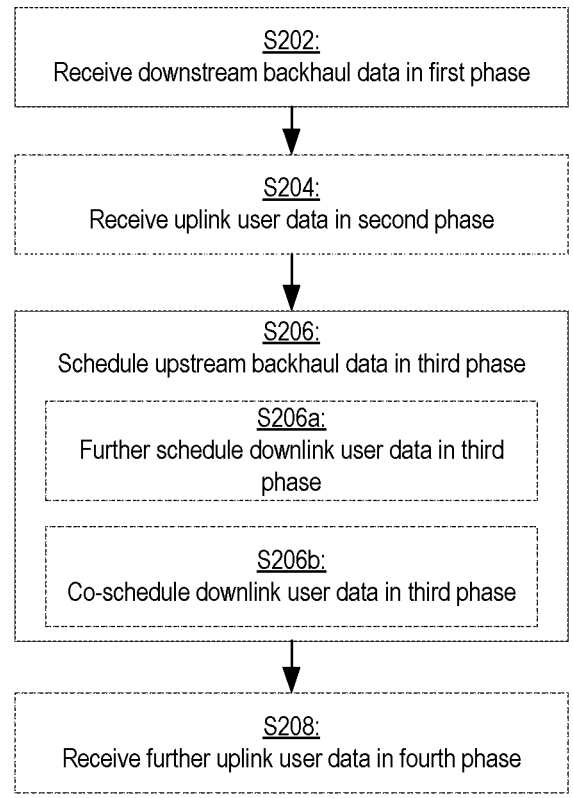
FIG. 14 is a flowchart illustrating embodiments of methods for performing IAB in a cellular telecommunications network.

FIG. 14 is a flowchart illustrating embodiments of methods for performing IAB in a cellular telecommunications network 100. The methods are performed by the second IAB node 200b. The methods are advantageously provided as computer programs.

Each IAB node in upstream communication with another IAB node schedules its own transmitted data. Hence, the second IAB node 200b is configured to perform actions S202 and S206:

S202: The second IAB node 200b receives, in a first phase (also denoted phase A), from the first IAB node 200a, downstream backhaul data as scheduled by the first IAB node 200a.

S206: The second IAB node 200b schedules, in a third phase (also denoted phase C), upstream backhaul data from the second IAB node 200b to the first IAB node 200a.

Embodiments relating to further details of performing IAB in a cellular telecommunications network 100 as performed by the second IAB node 200b will now be disclosed.

In some embodiments, uplink user data is received in a second phase (also denoted phase B). Hence, according to an embodiment, the second IAB node 200b is configured to perform (optional) action S204:

S204: The second IAB node 200b receives, in a second phase placed between the first phase and the third phase, uplink user data from a second user equipment 300b in communication with the second IAB node 200b, as scheduled by the second IAB node 200b.

The second IAB node 200b might in the second phase further receive uplink data from further user equipment, such as from a third user equipment 300c, in communication with the second IAB node 200b. In some examples the second user equipment 200b and the third user equipment 300c are served in different sectors of the cell served by IAB node 200b and/or are in communication with different radio units in the second IAB node 200b.

In some embodiments, further downlink user data is scheduled in the third phase. Hence, according to an embodiment, the second IAB node 200b is configured to perform (optional) action S206a as part of action S206:

S206a: The second IAB node 200b further schedules, in the third phase, downlink user data from the second IAB node 200b to the second user equipment 300b.

In some embodiments, further downlink user data is co-scheduled in the third phase. Hence, according to an embodiment, the second IAB node 200b is configured to perform (optional) action S206b as part of action S206:

S206b: The second IAB node 200b co-schedules, in the third phase, together with the upstream backhaul data, downlink user data from the second IAB node 200b to the second user equipment 300b and/or to a third user equipment 300c in communication with the second IAB node 200b.

In some embodiments, further uplink user data is received in a fourth phase (also denoted phase D). Hence, according to an embodiment, the second IAB node 200b is configured to perform (optional) action S208:

S208: The second IAB node 200b receives, in a fourth phase placed after the third phase and before a subsequent first phase, further uplink user data from the second user equipment 300b, as scheduled by the second IAB node 200b.

The second IAB node 200b might in the fourth phase further receive yet further uplink data from further user equipment, such as from the third user equipment 300c, in communication with the second IAB node 200b. as above, in some examples the second user equipment 200b and the third user equipment 300c are served in different sectors of the cell served by IAB node 200b and/or are in communication with different radio units in the second IAB node 200b.

In some embodiments, the second IAB node 200b does not receive uplink scheduling information from the first IAB node 200a in the first phase.

In some embodiments, the downstream backhaul data is composed of symbols, and wherein the last one or more symbols of the downstream backhaul data of the first phase are blanked.

In some embodiments, the upstream backhaul data is composed of symbols, and wherein the last one or more symbols of the upstream backhaul data of the third phase are blanked.

In some embodiments, downstream backhaul data of the first phase is acknowledged or negatively acknowledged by the second IAB node 200b in the third phase, and/or upstream backhaul data of the third phase is acknowledged or negatively acknowledged by the first IAB node 200a in a subsequent first phase.

In some embodiments, the upstream backhaul data includes variable number of slots from one third phase to a subsequent third phase.

In some embodiments, the variable number of slots is indicated by either a last backhaul slot indicator included in a last slot of the variable number of slots or a number of the variable number of slots included in a first slot of the variable number of slots.

In some embodiments, the upstream backhaul data is transmitted by a distributed unit (DU) at the second IAB node 200b.

In some embodiments, the downstream backhaul data is received by a first mobile termination (MT), interface at the second IAB node 200b.

In some embodiments, the first IAB node 200a is a parent IAB node and the second IAB node 200b is a child IAB node.

In this respect, an IAB could be a transit IAB node 200a/200b and thus one and the same IAB node 200a/200b could act as both child IAB node 200b with respect to another IAB node and parent IAB node 200a with respect to yet another IAB node. Below, IAB node 200a and IAB node 200*b* will be referred to in their role, i.e., donor node, child (IAB) node, parent (IAB) node, or just IAB node for short.

It is here also noted that what for one of the IAB nodes 200*a*, 200*b* is a first phase might be for another one of the IAB nodes 200*a*, 200*b* be a third phase, and what for one of the IAB nodes 200*a*, 200*b* is a second phase might be for another one of the IAB nodes 200*a*, 200*b* be a fourth phase. This depends on if an even or an odd number of other IAB nodes are separating these two IAB nodes and/or depends on which of these IAB nodes is located downstream the other of these IAB nodes.

Figure 15:
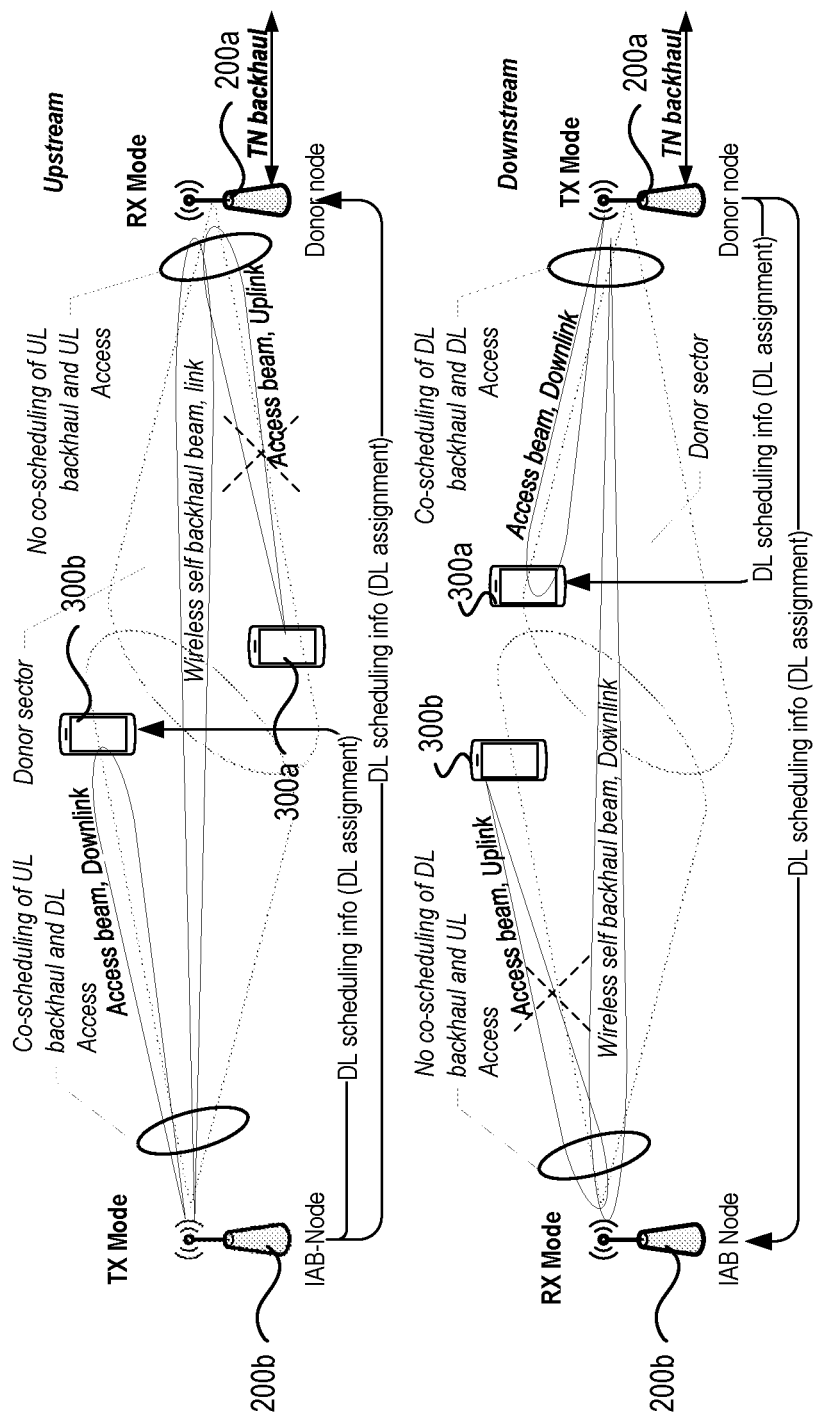
FIG. 15 illustrates the principle for reversed scheduling, according to some aspects of the present disclosure.

In view of the methods of FIG. 13 and FIG. 14 the invention thus introduces a reversed scheduling order according to the principle sketched in FIG. 15. This figure, together with FIG. 20 can be compared to earlier FIG. 7. The key difference in the modified reference model (FIG. 20) is the additional MT added to both the donor node as well as other IAB nodes (if in transit mode) which enables usage of only downlink scheduling for IAB data transfer in both downstream and upstream directions.

Figure 16:
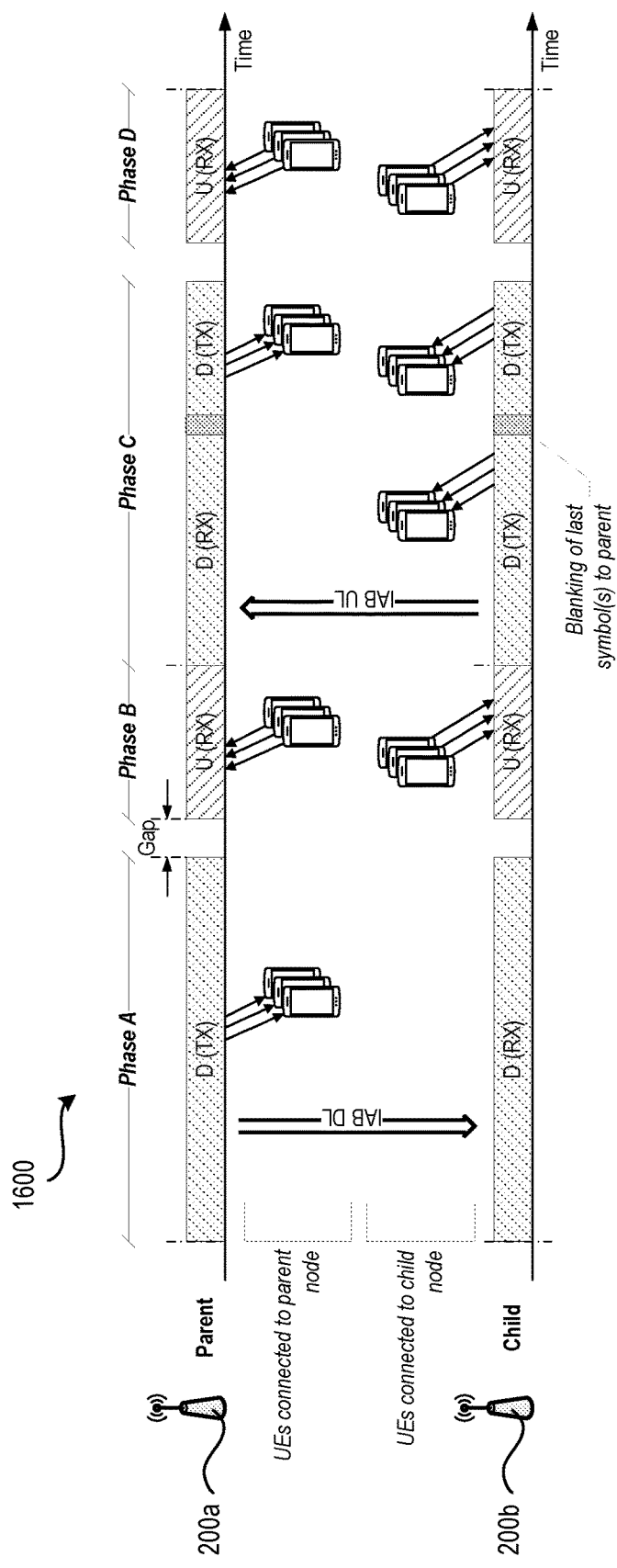
FIG. 16 depicts a timing overview for reversed scheduling, according to some aspects of the present disclosure.

FIG. 16 illustrates timing overview 1600 for the reversed scheduling. The difference compared to FIG. 12 is that, like the parent node during phase A, also the child node during phase C may co-schedule UEs together with upstream backhaul data. Also, as the scheduling in phase C is controlled from the child node, there is no need for neither UL scheduling information to the child node MT in phase A nor BSR/SR during previous phase C. Instead of using PUSCH, the PDSCH is used which is more aligned with the actual used TDD pattern.

Figure 17:
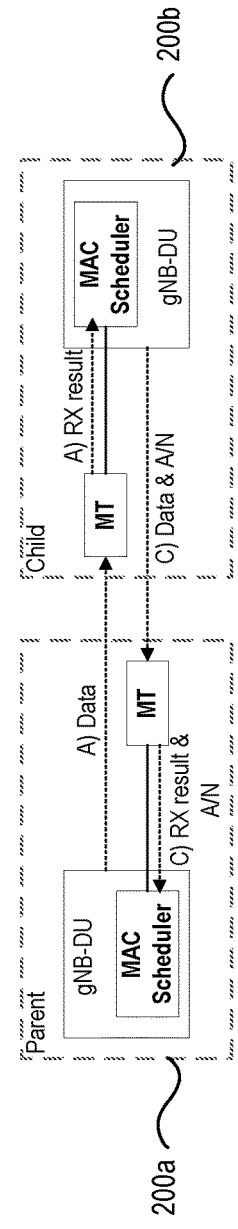
FIG. 17 shows Ack/Nack handling for reversed scheduling, according to some aspects of the present disclosure.

Reception status for the MAC/HARQ layer, either acknowledgement (ACK) or negative acknowledgement (NACK) for DL PDSCH transmission is in prior art using PUCCH. In a reversed scheduling scheme, there is no PUCCH used between parent and child nodes and instead the ACK/NACK information must be transferred on a separate "logical channel" or protocol layer for IAB link maintenance, e.g. in the adaptation layer specified for IAB, together with the data transmission. Similar is valid for other feedback information such as CSI. For the ACK/NACK handling, data transmitted in phase A can be acknowledged in phase C and vice versa, see FIG. 17.

Figure 18A:
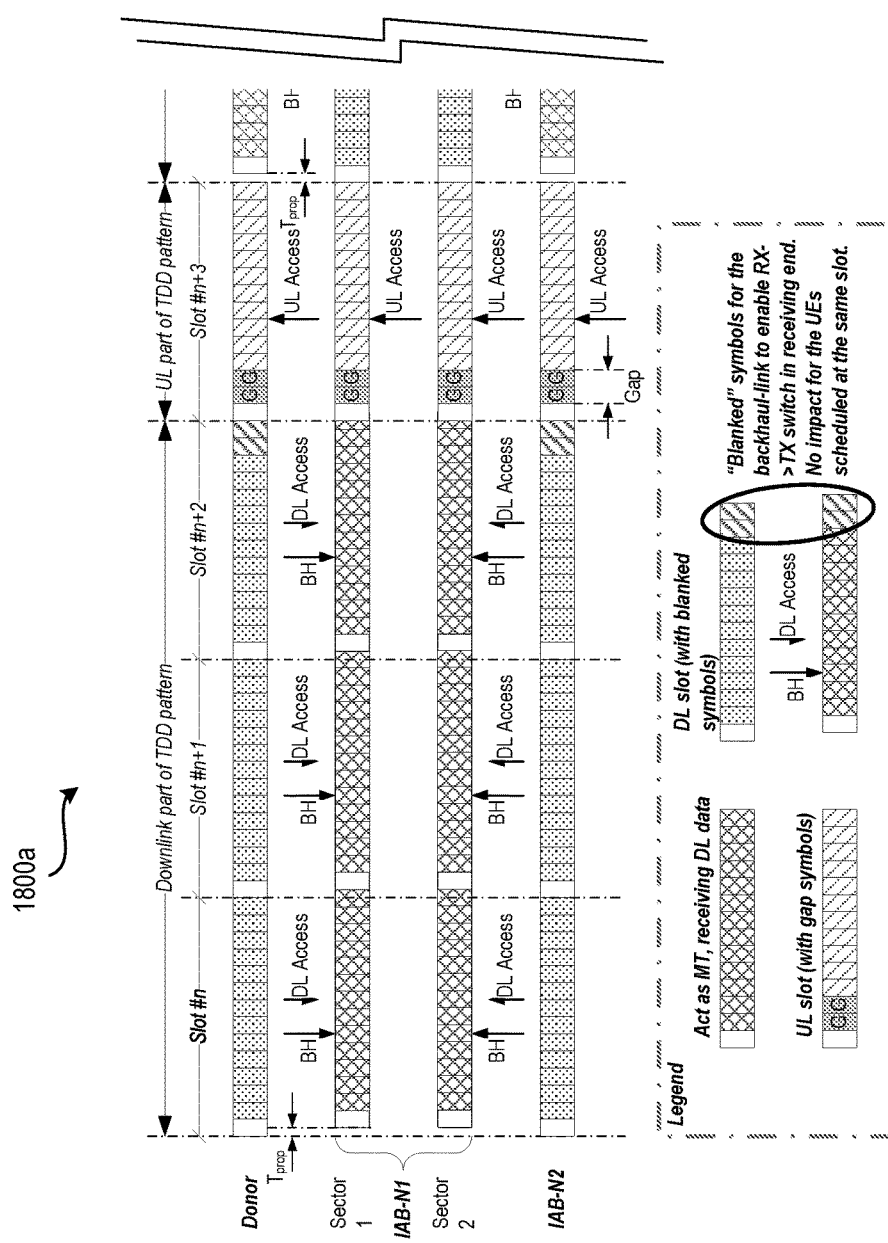

As illustrated in the timing overview 1800*a*, 1800*b* in FIG. 18, due to propagation delay there is a need to blank the last symbol(s) during phase A and at the end of the backhaul transfer of phase C to maintain correct TX/RX timing for the access link in the donor and IAB nodes.

FIG. 18 shows the general case where predefined static/semi-static transmission pattern is used. As mentioned earlier, the basic principle is to utilize DL slots for transmission of backhaul traffic and this reduces the time available to schedule DL data on the access link in the IAB nodes. The overall traffic pattern is typically "bursty" and there may be occasions when not all slots reserved for backhaul transmission are needed. Thus, it is beneficial to abort the backhaul transmission as early as possible to hand over the TDD DL slots for normal DL operation in the access nodes operating in inverted mode (i.e. for the nodes using RX during TDD DL phase).

Figure 19:
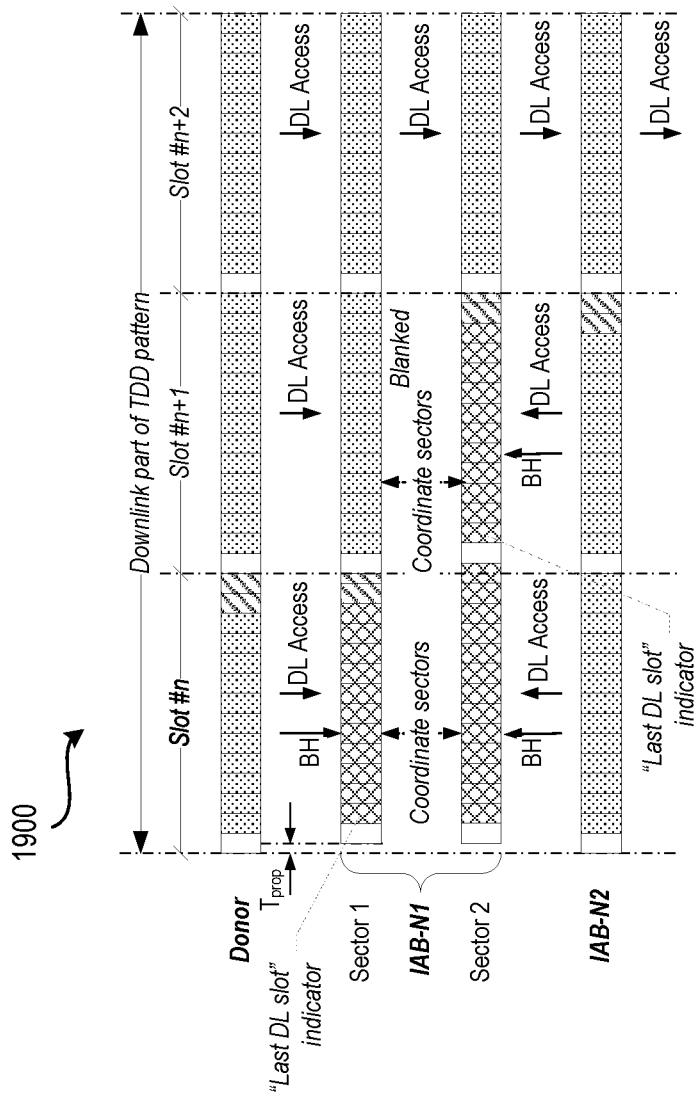
FIG. 19 shows early stop of backhaul data, according to some aspects of the present disclosure.

FIG. 19 illustrates a timing overview 1900 illustrating one way for how to handle the specific case mentioned in the previous paragraph. During a backhaul transfer phase, the transmitting node can indicate "last backhaul slot" within the applicable slot. Preferably, this information is included in the PDCCH to allow immediate decoding early in the slot. Alternatively, the number of used slots is indicated in the first slot of a backhaul transmission phase. This enables the receiving node to prepare for DL access link transmission in later slots otherwise reserved for backhaul reception. It shall be noted that for a transit node (IAB-N1 in FIG. 19), both backhaul links must fulfill the early stop criteria to avoid self-interference between sectors of the same node. Thus, there is a need to coordinate "early stop" status between the sectors of a transit node and if non-aligned status between sectors, the sector in which backhaul transmission is completed must blank its downlink until other collocated sectors have completed their backhaul reception.

The "early stop indicator" or "the number of used slots" information can alternatively be used to indicate the backhaul operation for the next backhaul phase, e.g., during phase A (also referred to as the first phase), the parent node indicates the number of slots to be used for backhaul transmission in phase C (also referred to as the third phase) and similar between phase C and A.

Figure 7:
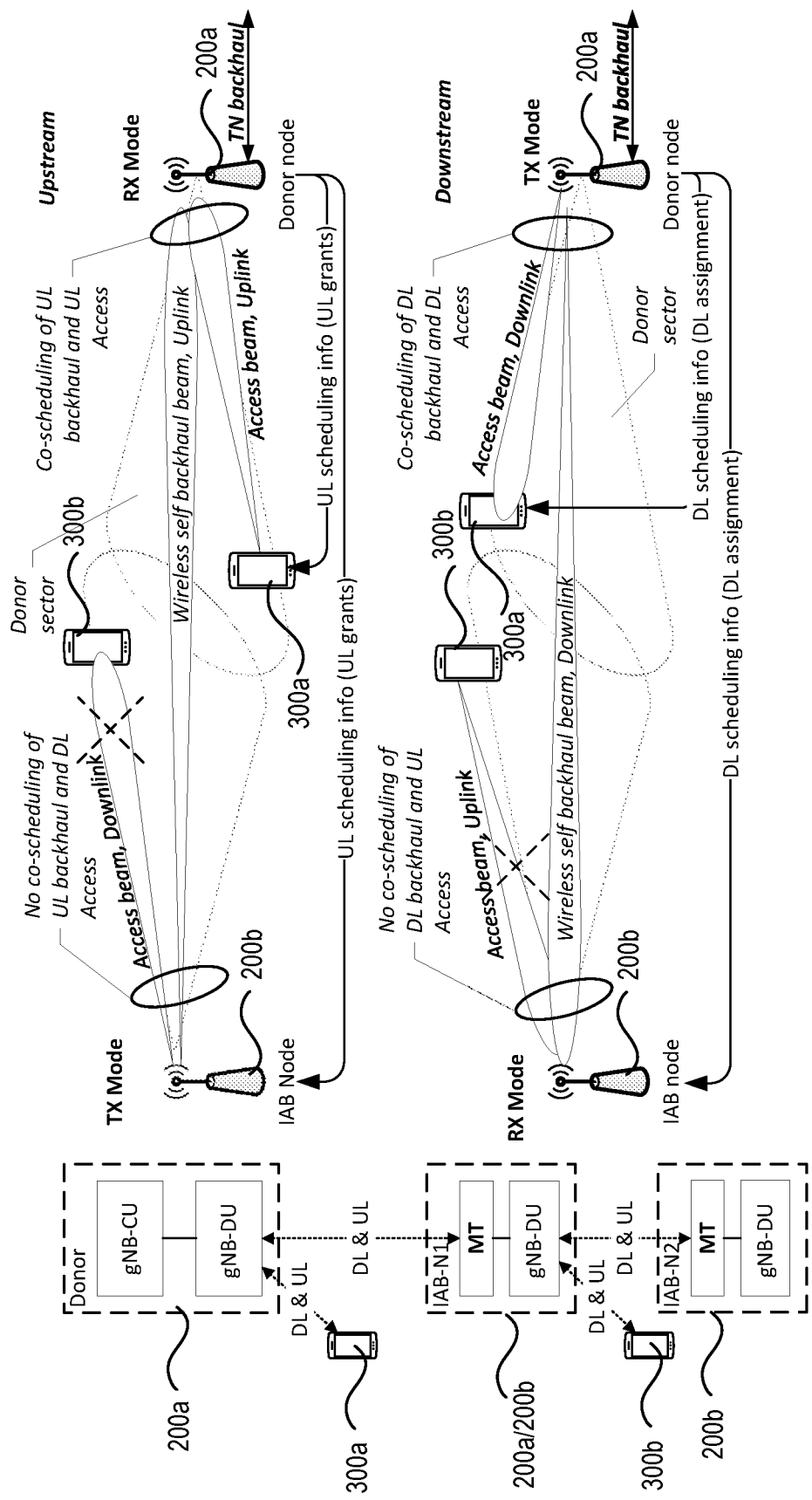
FIG. 7 showing scheduling principles according to 3GPP TR 38.874.
Figure 20:
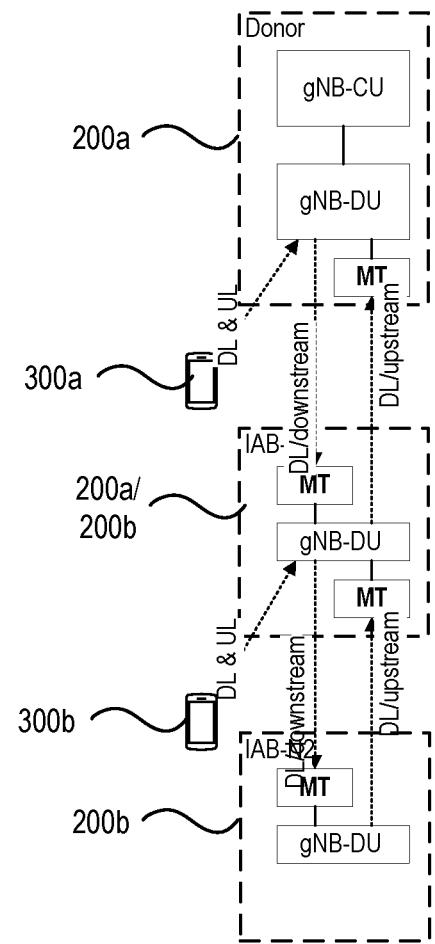
FIG. 20 is a diagram of an updated model for donor and IAB nodes, according to some aspects of the present disclosure.

In FIG. 20, compared to FIG. 7, MT functionality is added to the donor node to enable reception of downlink (but upstream) scheduling from the child IAB node(s). Similar is valid for the IAB node (when acting as a transit node) in which there is yet another MT function added to receive upstream traffic from its child node(s).

Figure 1:
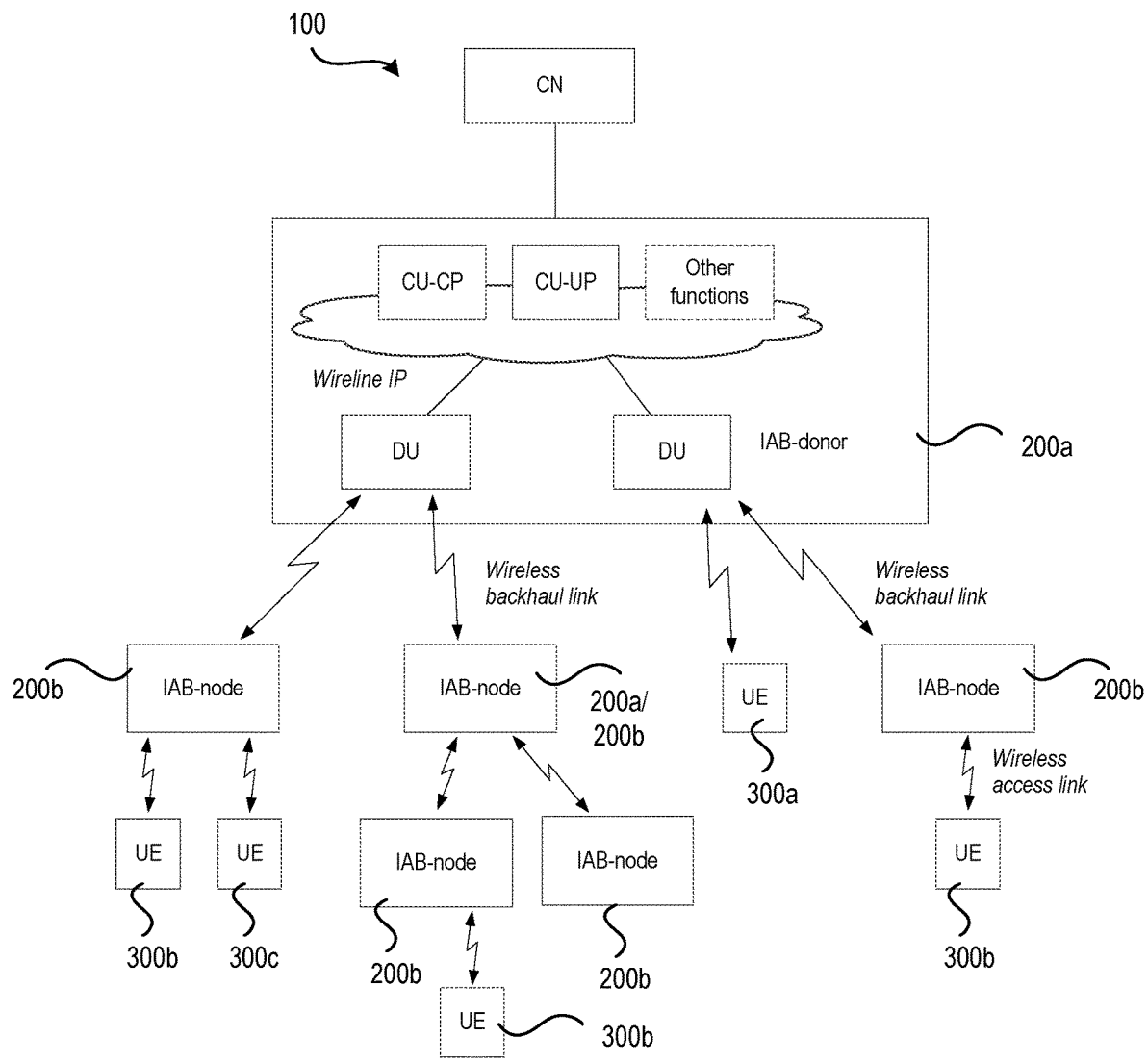
FIG. 1 illustrates an integrated access and backhaul high-level architecture.
Figure 2:
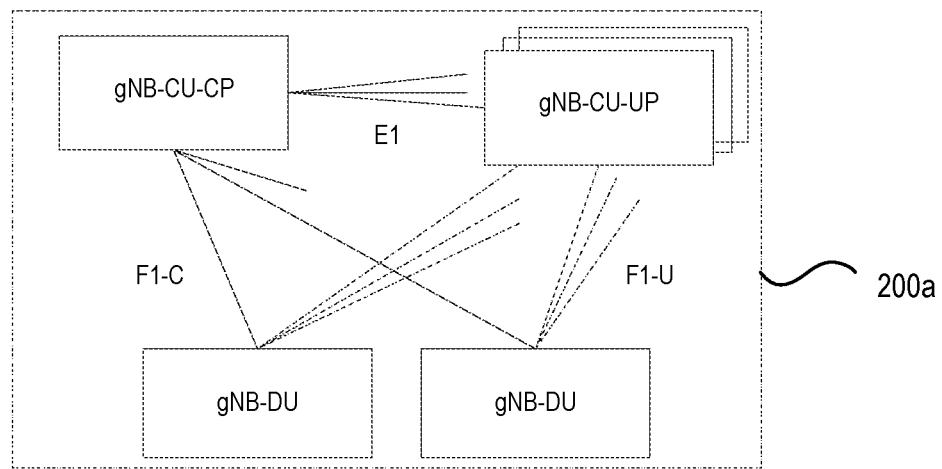
FIG. 2 illustrates an NG-RAN overall architecture.
Figure 3:
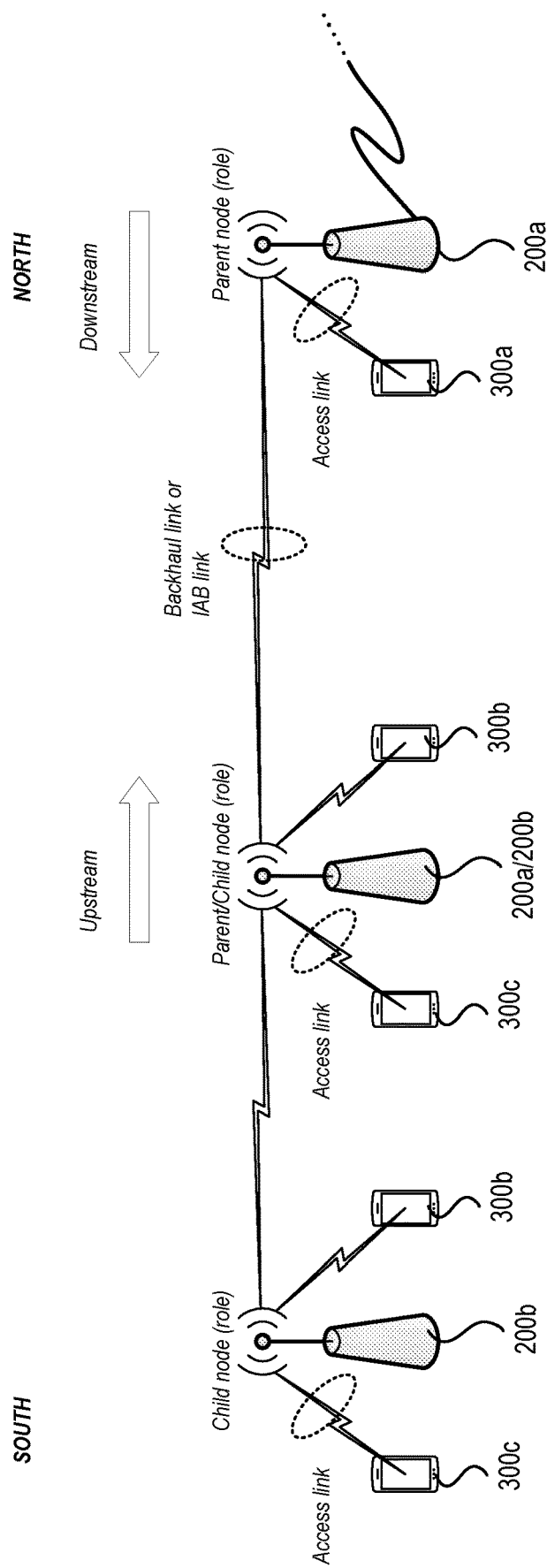
FIG. 3 illustrates additional aspects of an integrated access and backhaul high-level architecture.
Figure 4:
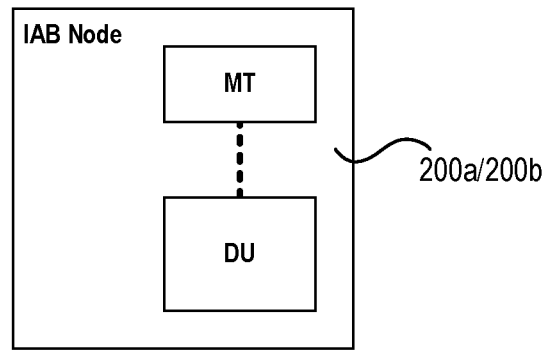
FIG. 4 shows some internal functionality of an IAB node based on the gNB split architecture.
Figure 5:
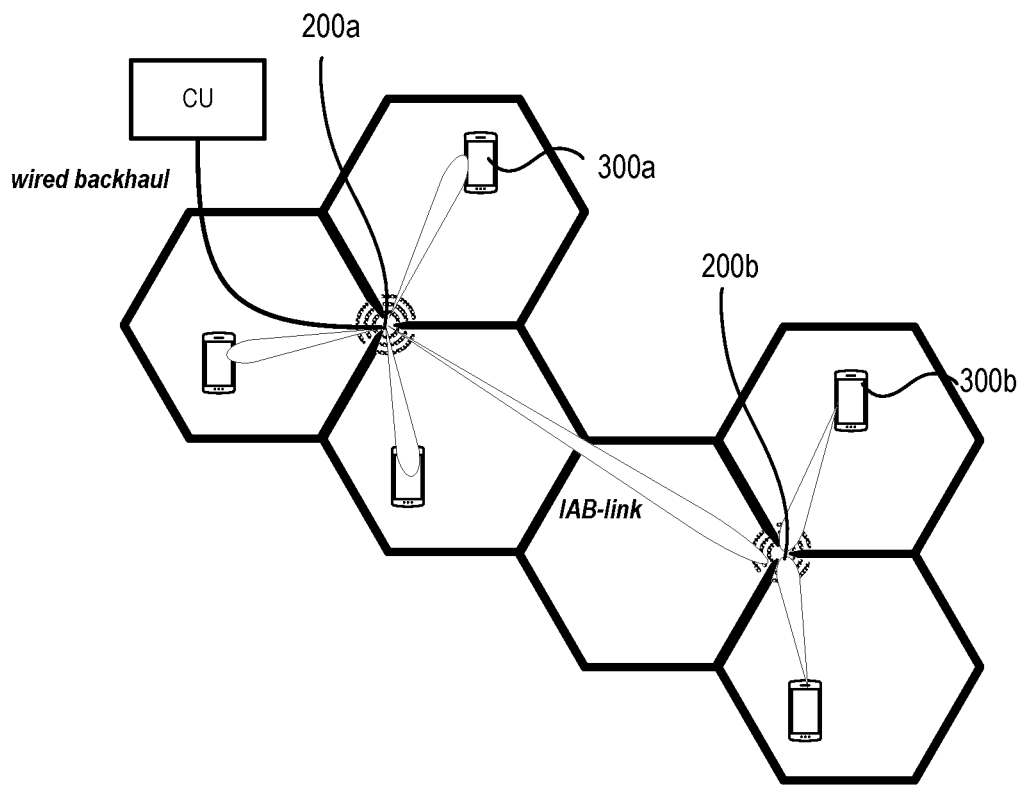
FIG. 5 shows an IAB deployment with multiple sectors.
Figure 6A:
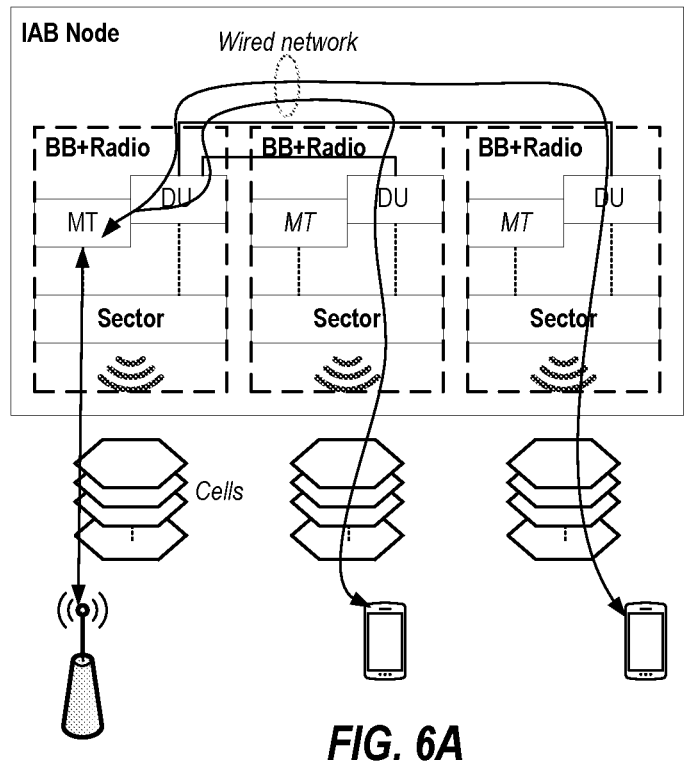
FIGS. 6A and 6B show IAB nodes with several sectors and multiple DUs (6A) or single DU (6B) with one active MT.
Figure 6B:
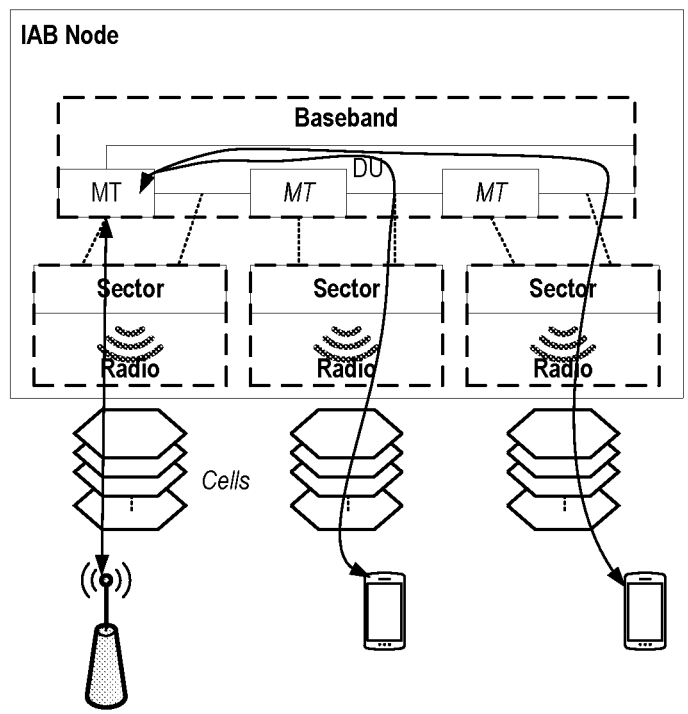
Figure 21:
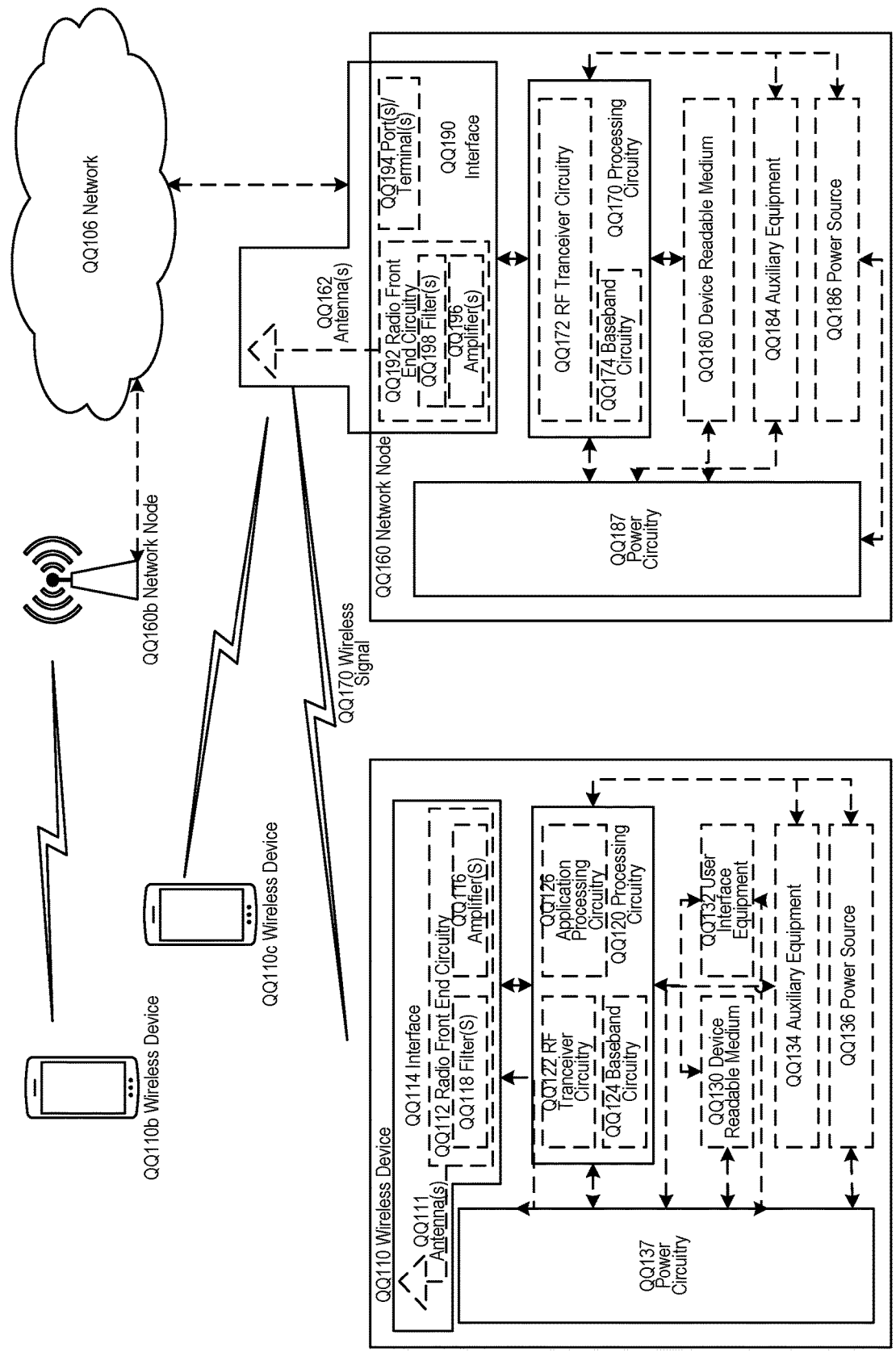
FIG. 21 depicts a wireless network in accordance with some aspects of the present disclosure.

Although the subject matter described herein may be implemented in any appropriate type of system using any suitable components, the embodiments disclosed herein are described in relation to a wireless network, such as the example wireless network illustrated in FIG. 21 that could correspond to the cellular telecommunications network 100 of FIG. 1. For simplicity, the wireless network of FIG. 21 only depicts network QQ106, network nodes QQ160 and QQ160*b* that corresponds to the previously mentioned IAB nodes 200*a*, 200*b*, and wireless devices (WDs) QQ110, QQ110*b*, and QQ110*c* that corresponds to the previously mentioned UEs. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node, such as at least one of the first IAB node 200a and the second IAB node 200b. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 21 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 22:
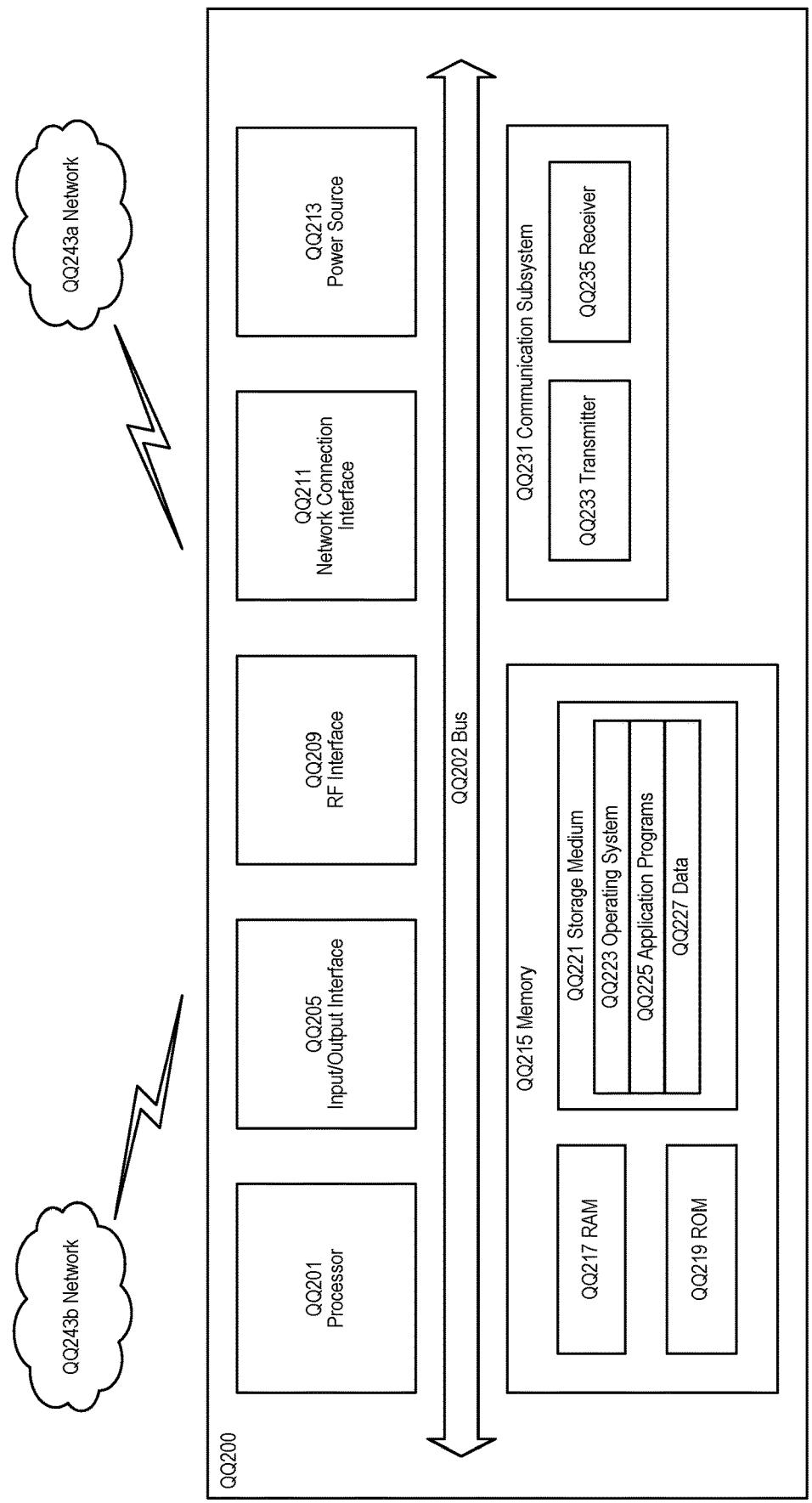
FIG. 22 depicts a user equipment in accordance with some aspects of the present disclosure.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 22, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 22, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 23:
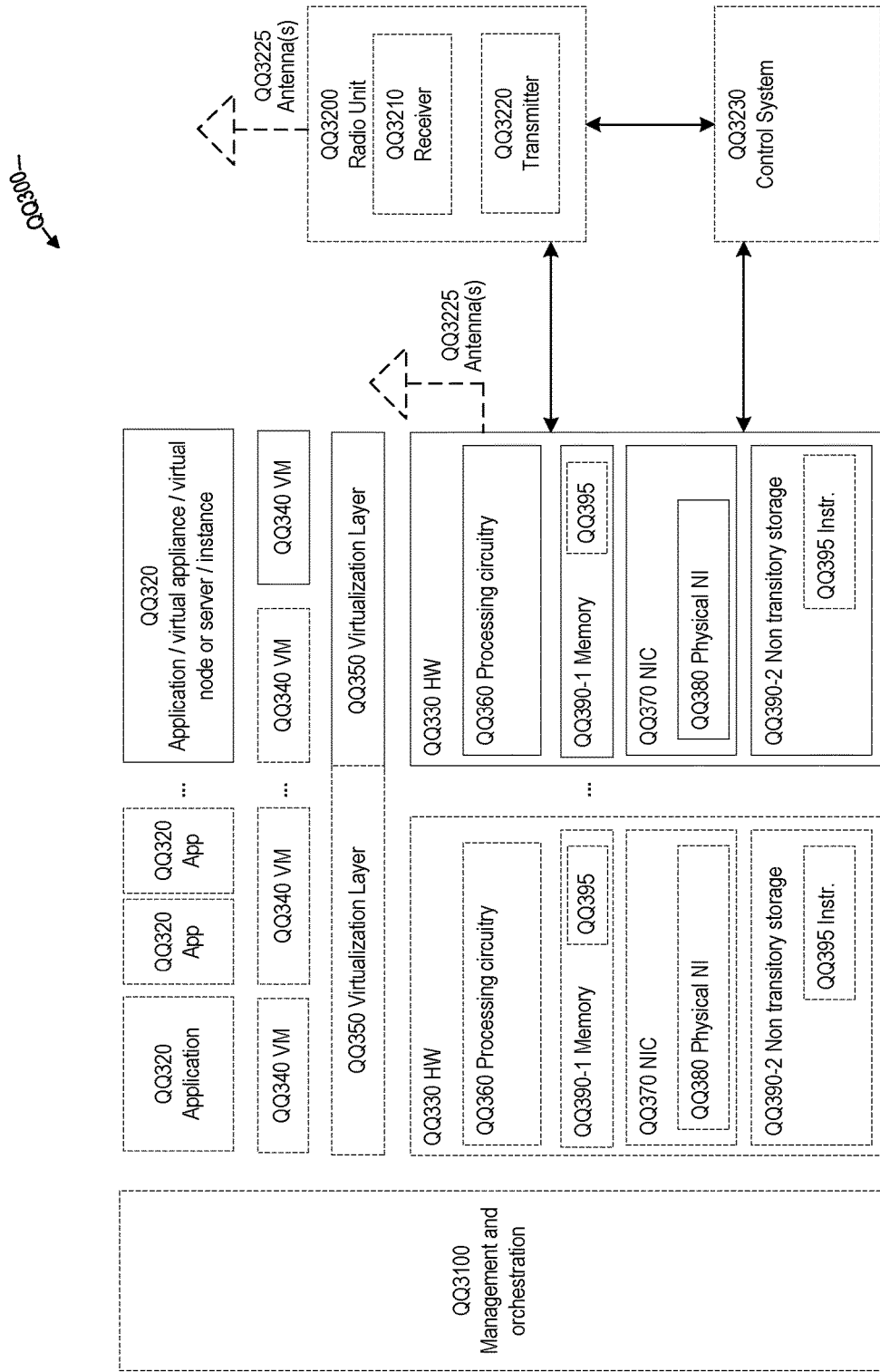
FIG. 23 depicts a virtualization environment in accordance with some aspects of the present disclosure.

FIG. 23 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 23, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 23.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 24:
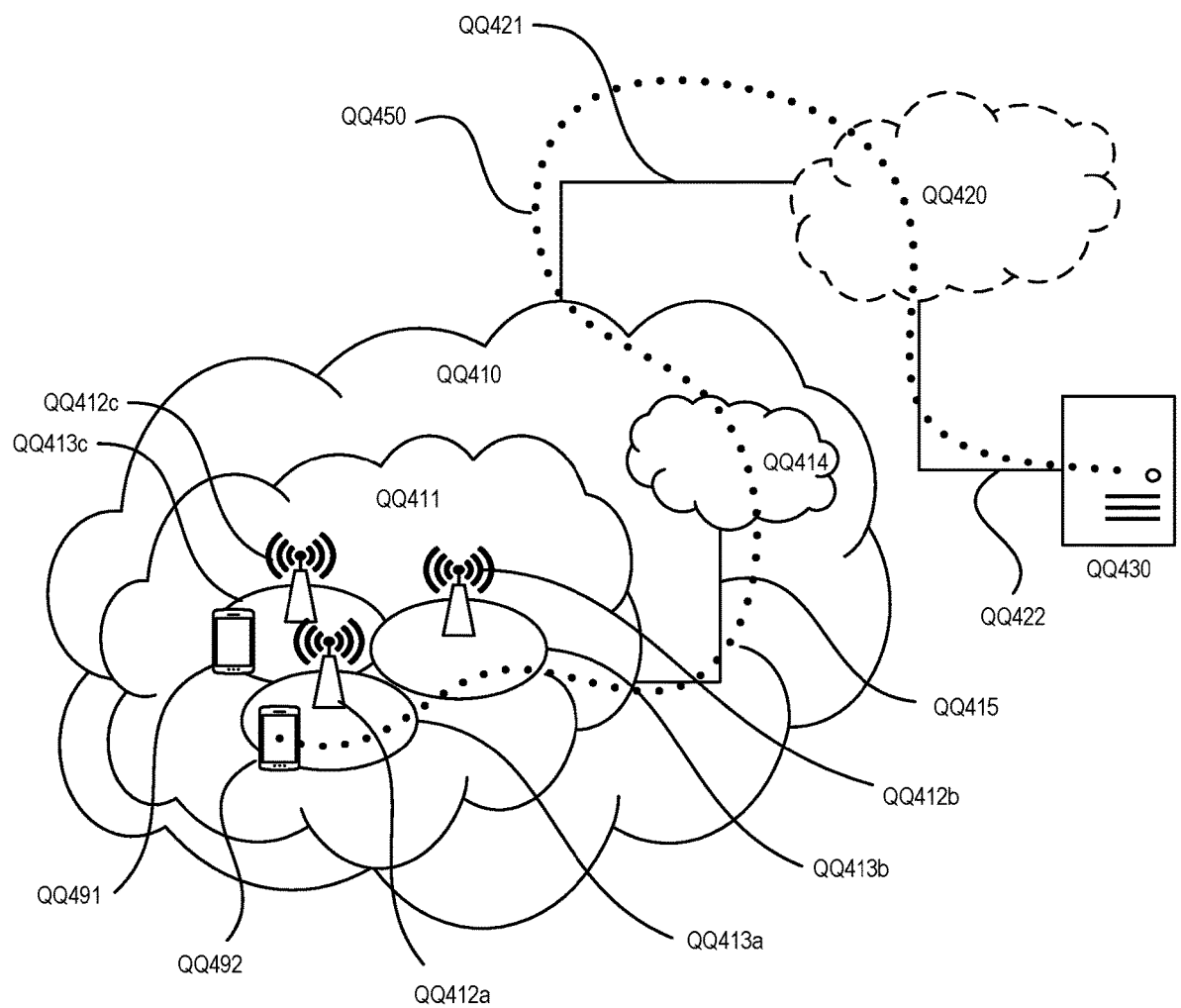
FIG. 24 depicts a network connected via an intermediate network to a host computer in accordance with some aspects of the present disclosure.

With reference to FIG. 24, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 24 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 25. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 25) served by base station QQ520. Communication interface QQ526 may be configured to facilitate connection QQ560 to host computer QQ510. Connection QQ560 may be direct or it may pass through a core network (not shown in FIG. 25) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 25:
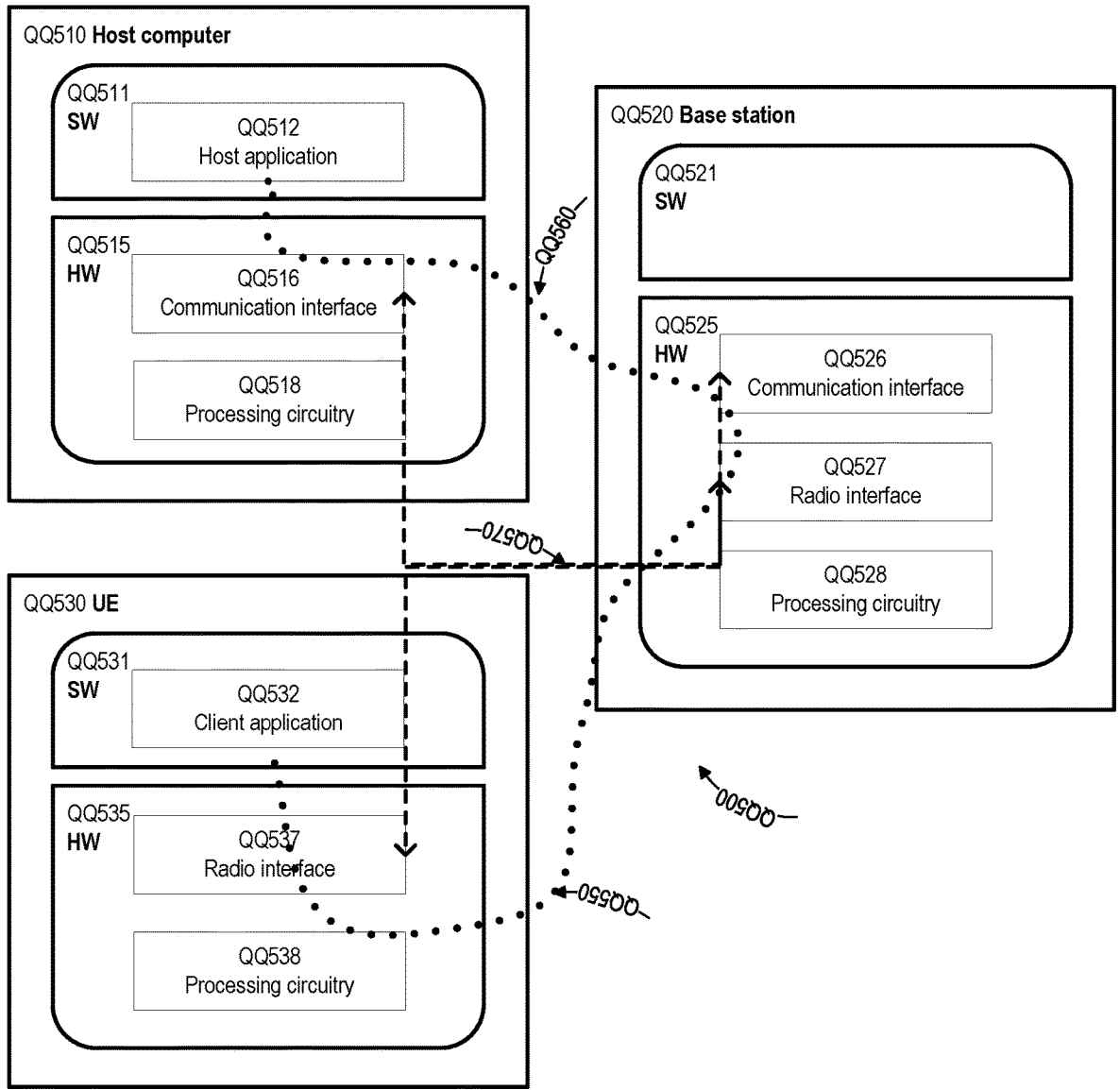
FIG. 25 depicts a host computer communicating via a base station with a user equipment over a partially wireless connection in accordance with some aspects of the present disclosure.

It is noted that host computer QQ510, base station QQ520 and UE QQ530 illustrated in FIG. 25 may be similar or identical to host computer QQ430, one of base stations QQ412a, QQ412b, QQ412c and one of UEs QQ491, QQ492 of FIG. 24, respectively. This is to say, the inner workings of these entities may be as shown in FIG. 25 and independently, the surrounding network topology may be that of FIG. 24.

In FIG. 25, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the scheduling of communications between network nodes exchanging information over an integrated access and backhaul link while simultaneously sending downlink data to a user equipment over an access link and thereby provide benefits such as reduced user waiting time and/or improved responsiveness while decreasing the need for wired backhaul links.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 26 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 26 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 27 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 27 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 28 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 28 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 29 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 29 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

SOME EXEMPLARY EMBODIMENTS

Group A Embodiments

1. A network node configured for use in an integrated access and backhaul implementation, the network node comprising:
  a distributed unit (DU);
  a first mobility termination (MT), the first MT configured to receive downstream data from an upstream node; and
  a second MT, wherein the second MT is configured to receive upstream data from a downstream node.
2. The network node of the previous embodiment (a), wherein the upstream node is a donor node.
3. The network node of the previous embodiment(s), wherein the network node, in a TX mode, performs co-scheduling of uplink backhaul traffic with the downstream node and downlink access traffic with a first user equipment that communicates with the network node.
4. The network node of the previous embodiment(s), wherein performing co-scheduling comprises scheduling different resources during a single phase.
5. The network node of the previous embodiment(s), wherein the downstream node performs co-scheduling of downlink backhaul traffic with the network node and downlink access traffic with a second user equipment that communicates with the downstream node.
6. The network node of the previous embodiments(s), wherein ACK/NACK information is communicated between network node and the downstream node via an adaption layer specified for integrated access and backhaul.
7. The network node of the previous embodiments(s), wherein ACK/NACK information is not communicated between network node and the downstream node via the physical uplink control channel (PUCCH).

Group B Embodiments

8. A method for performing integrated access and backhaul (IAB) in a cellular telecommunications network that includes a parent IAB node and a child IAB node, the method comprising:
  in a first phase, transmitting downstream backhaul data from the parent IAB node to the child IAB node and scheduling a first user equipment in communication with the parent IAB node;
  in a second phase, receiving, by the parent IAB node, uplink data from the first user equipment;

in a third phase, receiving, by the parent node, upstream backhaul data from the child IAB node and scheduling a second user equipment in communication with the child IAB node, wherein the child IAB node controls the scheduling of the second user equipment; and in a fourth phase, receiving, by the parent IAB node, uplink data from the first user equipment and receiving, by the child IAB node, uplink data from the second user equipment.

9. The method of the previous embodiment, wherein the parent IAB node does not transmit uplink scheduling information to the parent IAB node in the first phase.

10. The method of the previous embodiment(s), wherein:
the last one or more symbols of the first phase are blanked; and
the last one or more symbols of a backhaul transfer portion of the third phase are blanked.

11. The method of the previous embodiment(s), wherein:
data transmitted in the first phase is acknowledged or negatively acknowledged in the third phase; and/or
data transmitted in the third phase is acknowledged or negatively acknowledged in a subsequent first phase.

12. The method of the previous embodiments, wherein the backhaul transfer portion of the third phase includes variable number of slots.

13. The method of the previous embodiment(s), wherein the variable number of slots is indicated by:
a last backhaul slot indicator included in a last slot of the variable number of slots; or
a number of the variable number of slots included in a first slot of the variable number of slots.

Group C Embodiments

14. A method performed by a base station for implementing integrated access and backhaul communication, the method comprising:
in a first phase, transmitting downstream backhaul data from the base station acting as a parent IAB node to the child IAB node and scheduling a first user equipment in communication with the parent IAB node;
in a second phase, receiving, by the parent IAB node, uplink data from the first user equipment;
in a third phase, receiving, by the parent node, upstream backhaul data from the child IAB node and scheduling a second user equipment in communication with the child IAB node, wherein the child IAB node controls the scheduling of the second user equipment; and
in a fourth phase, receiving, by the parent node, uplink data from the first user equipment and receiving, by the child IAB node, uplink data from the second user equipment.

15. The method of any of the previous embodiments, further comprising:
obtaining user data; and
forwarding the user data to a host computer or a wireless device.

16. A base station for communicating in the integrated access and backhaul configuration, the base station comprising:
processing circuitry configured to perform any of the steps of any of the Group B embodiments;
power supply circuitry configured to supply power to the wireless device.

17. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

18. The communication system of the previous embodiment further including the base station.

19. The communication system of the previous 2 embodiments, further including the UE, wherein the UE is configured to communicate with the base station.

20. The communication system of the previous 3 embodiments, wherein:
the processing circuitry of the host computer is configured to execute a host application, thereby providing the user data; and
the UE comprises processing circuitry configured to execute a client application associated with the host application.

21. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

22. The method of the previous embodiment, further comprising, at the base station, transmitting the user data.

23. The method of the previous 2 embodiments, wherein the user data is provided at the host computer by executing a host application, the method further comprising, at the UE, executing a client application associated with the host application.

24. The method of the previous embodiment, further comprising at the UE, receiving the user data from the base station.

25. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

26. The communication system of the previous embodiment further including the base station.

27. The communication system of the previous 2 embodiments, further including the UE, wherein the UE is configured to communicate with the base station.

28. The communication system of the previous 3 embodiments, wherein:
the processing circuitry of the host computer is configured to execute a host application;
the UE is configured to execute a client application associated with the host application, thereby providing the user data to be received by the host computer.

REFERENCES

The following references are incorporated herein by reference.

1. Study on Integrated Access and Backhaul, 3GPP TR 38.874 ver 1.0.0
2. NG-RAN, Architecture Description, 3GPP TS 38.401 ver 15.3.0

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

- BSR Buffer Status Report
- CE Control Element
- CN Core Network
- CP Control Plane
- CSI Channel State Information
- CU Central Unit
- DCI Downlink Control Information
- DL Downlink
- DU Distributed Unit
- HARQ Hybrid Automatic Repeat Request
- IAB Integrated Access and Backhaul
- LTE Long Term Evolution
- MAC Medium Access Control
- MIMO Multiple Input Multiple Output
- MT Mobile Termination
- NR New Radio
- PDCCH Physical Downlink Control Channel
- PDSCH Physical Downlink Shared Channel
- PUCCH Physical Uplink Control Channel
- PUSCH Physical Uplink Shared Channel
- RX Receive (or Receiver)
- SR Scheduling Request
- TDD Time Division Duplex
- TR Technical Report
- TX Transmit (or Transmitter)
- UE User Equipment
- UL Uplink
- 1×RTT CDMA2000 1× Radio Transmission Technology
- 3GPP 3rd Generation Partnership Project
- 5G 5th Generation
- ABS Almost Blank Subframe
- ARQ Automatic Repeat Request
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CP Cyclic Prefix
- CPICH Common Pilot Channel
- CPICH Ec/No CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eNB E-UTRAN NodeB
- ePDCCH enhanced Physical Downlink Control Channel
- E-SMLC evolved Serving Mobile Location Center
- E-UTRA Evolved UTRA
- E-UTRAN Evolved UTRAN
- FDD Frequency Division Duplex
- FFS For Further Study
- GERAN GSM EDGE Radio Access Network
- gNB Base station in NR
- GNSS Global Navigation Satellite System
- GSM Global System for Mobile communication
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Medium Access Control
- MBMS Multimedia Broadcast Multicast Services
- MBSFN Multimedia Broadcast multicast service Single Frequency Network
- MBSFN ABS MBSFN Almost Blank Subframe
- MDT Minimization of Drive Tests
- MIB Master Information Block
- MME Mobility Management Entity
- MSC Mobile Switching Center
- NPDCCH Narrowband Physical Downlink Control Channel
- NR New Radio
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCFICH Physical Control Format Indicator Channel
- PDCCH Physical Downlink Control Channel
- PDP Profile Delay Profile
- PDSCH Physical Downlink Shared Channel
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PSS Primary Synchronization Signal
- PUCCH Physical Uplink Control Channel
- PUSCH Physical Uplink Shared Channel
- RACH Random Access Channel
- QAM Quadrature Amplitude Modulation
- RAN Radio Access Network
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for performing integrated access and backhaul, IAB, in a cellular telecommunications network that comprises a first IAB node and a second IAB node, the method being performed by the first IAB node, the method comprising:
   scheduling, in a first phase, downstream backhaul data from the first IAB node to the second IAB node; and
   receiving, in a third phase, from the second IAB node, upstream backhaul data as scheduled by the second IAB node;
   wherein:
      the downstream backhaul data of the first phase is acknowledged or negatively acknowledged by the second IAB node in the third phase, or
      the upstream backhaul data of the third phase is acknowledged or negatively acknowledged by the first IAB node in a subsequent first phase, or
      both the downstream backhaul data of the first phase is acknowledged or negatively acknowledged by the second IAB node in the third phase and the upstream backhaul data of the third phase is acknowledged or negatively acknowledged by the first IAB node in the subsequent first phase.

2. The method according to claim 1, further comprising:
   further scheduling, in the first phase, downlink user data from the first IAB node to a first user equipment in communication with the first IAB node.

3. The method according to claim 2, further comprising: receiving, in a second phase placed between the first phase and the third phase, uplink user data from the first user equipment, as scheduled by the first IAB node.

4. The method according to claim 2, further comprising: further scheduling, in the third phase, further downlink user data from the first IAB node to the first user equipment.

5. The method according to claim 1, further comprising:
   receiving, in a fourth phase placed after the third phase and before the subsequent first phase, further uplink user data from the first user equipment, as scheduled by the first IAB node.

6. The method according to claim 1, wherein the first IAB node does not transmit uplink scheduling information to the second IAB node in the first phase.

7. The method according to claim 1, wherein the downstream backhaul data is composed of symbols, and wherein the last one or more symbols of the downstream backhaul data of the first phase are blanked.

8. The method according to claim 1, wherein the upstream backhaul data is composed of symbols, and wherein the last one or more symbols of the upstream backhaul data of the third phase are blanked.

9. A method for performing integrated access and backhaul, IAB, in a cellular telecommunications network that comprises a first IAB node and a second IAB node, the method being performed by the second IAB node, the method comprising:
   receiving, in a first phase, from the first IAB node, downstream backhaul data as scheduled by the first IAB node; and
   scheduling, in a third phase, upstream backhaul data from the second IAB node to the first IAB node;
   wherein:
      the downstream backhaul data of the first phase is acknowledged or negatively acknowledged by the second IAB node in the third phase, or
      the upstream backhaul data of the third phase is acknowledged or negatively acknowledged by the first IAB node in a subsequent first phase, or
      both the downstream backhaul data of the first phase is acknowledged or negatively acknowledged by the second IAB node in the third phase and the upstream backhaul data of the third phase is acknowledged or negatively acknowledged by the first IAB node in the subsequent first phase.

10. The method according to claim 9, further comprising:
   receiving, in a second phase placed between the first phase and the third phase, uplink user data from a second user equipment in communication with the second IAB node, as scheduled by the second IAB node.

11. The method according to claim 10, further comprising:
   further scheduling, in the third phase, downlink user data from the second IAB node to the second user equipment.

12. The method according to claim 10, further comprising:
   co-scheduling, in the third phase, together with the upstream backhaul data, downlink user data from the second IAB node to the second user equipment and/or to a third user equipment in communication with the second IAB node.

13. The method according to claim 9, further comprising:
   receiving, in a fourth phase placed after the third phase and before the subsequent first phase, further uplink user data from the second user equipment, as scheduled by the second IAB node.

14. The method according to claim 9, wherein the second IAB node does not receive uplink scheduling information from the first IAB node in the first phase.

15. The method according to claim 9, wherein the downstream backhaul data is composed of symbols, and wherein the last one or more symbols of the downstream backhaul data of the first phase are blanked.

16. The method according to claim 9, wherein the upstream backhaul data is composed of symbols, and wherein the last one or more symbols of the upstream backhaul data of the third phase are blanked.

17. A first integrated access and backhaul, IAB, node for performing IAB in a cellular telecommunications network that comprises the first IAB node and a second IAB node, the first IAB node comprising processing circuitry, the processing circuitry causing the first IAB node to:
schedule, in a first phase, downstream backhaul data from the first IAB node to the second IAB node; and
receive, in a third phase, from the second IAB node, upstream backhaul data as scheduled by the second IAB node;
wherein:
the downstream backhaul data of the first phase is acknowledged or negatively acknowledged by the second IAB node in the third phase, or
the upstream backhaul data of the third phase is acknowledged or negatively acknowledged by the first IAB node in a subsequent first phase, or
both the downstream backhaul data of the first phase is acknowledged or negatively acknowledged by the second IAB node in the third phase and the upstream backhaul data of the third phase is acknowledged or negatively acknowledged by the first IAB node in the subsequent first phase.

18. A second integrated access and backhaul, IAB, node for performing IAB in a cellular telecommunications network that comprises a first IAB node and the second IAB node, the second IAB node comprising processing circuitry, the processing circuitry causing the second IAB node to:
receive, in a first phase, from the first IAB node, downstream backhaul data as scheduled by the first IAB node; and
schedule, in a third phase, upstream backhaul data from the second IAB node to the first IAB node wherein:
the downstream backhaul data of the first phase is acknowledged or negatively acknowledged by the second IAB node in the third phase, or
the upstream backhaul data of the third phase is acknowledged or negatively acknowledged by the first IAB node in a subsequent first phase, or
both the downstream backhaul data of the first phase is acknowledged or negatively acknowledged by the second IAB node in the third phase and the upstream backhaul data of the third phase is acknowledged or negatively acknowledged by the first IAB node in the subsequent first phase.

* * * * *